United States Patent
Thomas et al.

(10) Patent No.: US 11,405,179 B2
(45) Date of Patent: *Aug. 2, 2022

(54) MULTIMODE CRYPTOGRAPHIC PROCESSOR

(71) Applicant: Fungible, Inc., Santa Clara, CA (US)

(72) Inventors: Philip A. Thomas, San Jose, CA (US); Rajan Goyal, Saratoga, CA (US); Eric Scot Swartzendruber, Austin, TX (US)

(73) Assignee: Fungible, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,823

(22) Filed: Mar. 15, 2021

(65) Prior Publication Data

US 2021/0281394 A1 Sep. 9, 2021

Related U.S. Application Data

(62) Division of application No. 16/157,265, filed on Oct. 11, 2018, now Pat. No. 10,951,393.

(51) Int. Cl.
*H04L 9/06* (2006.01)
*H04L 9/14* (2006.01)

(52) U.S. Cl.
CPC .......... *H04L 9/0631* (2013.01); *H04L 9/0637* (2013.01); *H04L 9/0643* (2013.01); *H04L 9/14* (2013.01); *H04L 2209/125* (2013.01)

(58) Field of Classification Search
CPC ... H04L 9/0631; H04L 9/0637; H04L 9/0643; H04L 9/14; H04L 2209/125
USPC .......................................................... 380/28
See application file for complete search history.

(56) References Cited

U.S. PATENT DOCUMENTS

| | | | |
|---|---|---|---|
| 7,885,405 B1 * | 2/2011 | Bong | H04L 9/0637 713/153 |
| 8,023,644 B2 | 9/2011 | Bolotov et al. | |
| 10,540,288 B2 | 1/2020 | Noureddine et al. | |
| 10,841,245 B2 | 1/2020 | Gray et al. | |
| 10,949,303 B2 | 3/2021 | Kohli | |

(Continued)

FOREIGN PATENT DOCUMENTS

| | | | | |
|---|---|---|---|---|
| CN | 109905412 A | * | 6/2019 | |
| CN | 110347634 A | * | 10/2019 | ........... G06F 15/167 |
| WO | WO-2019061271 A1 | * | 4/2019 | ............. G06F 21/60 |

OTHER PUBLICATIONS

Silitonga et al., "Reconfigurable Module of Multi-mode AES Cryptographic Algorithms for AP SoCs", IEEE, doi: 10.1109/NORCHIP.2019.8906923, 2019, pp. 1-7. (Year: 2019).*

(Continued)

*Primary Examiner* — Peter C Shaw
(74) *Attorney, Agent, or Firm* — Shumaker & Sieffert, P.A.

(57) ABSTRACT

This disclosure describes techniques that include performing cryptographic operations (encryption, decryption, generation of a message authentication code). Such techniques may involve the data processing unit performing any of multiple modes of encryption, decryption, and/or other cryptographic operation procedures or standards, including, Advanced Encryption Standard (AES) cryptographic operations. In some examples, the security block is implemented as a unified, multi-threaded, high-throughput encryption and decryption system for performing multiple modes of AES operations.

18 Claims, 22 Drawing Sheets

(56) References Cited

U.S. PATENT DOCUMENTS

| | | | |
|---|---|---|---|
| 10,951,393 | B2 | 3/2021 | Thomas et al. |
| 2009/0060197 | A1 | 3/2009 | Taylor et al. |
| 2010/0195820 | A1* | 8/2010 | Frank .................... H04L 9/0631 380/28 |
| 2011/0255689 | A1 | 10/2011 | Bolotov et al. |
| 2016/0182223 | A1* | 6/2016 | Kishinevsky ......... G06F 21/602 380/28 |
| 2017/0063532 | A1 | 3/2017 | Bhattacharyya et al. |
| 2018/0287965 | A1 | 10/2018 | Sindhu et al. |
| 2018/0293168 | A1 | 10/2018 | Noureddine et al. |

OTHER PUBLICATIONS

Azmat et al., "An indigenous, customized, multi key and multimode cryptographic engine in FPGA", IEEE, doi: 10.1109/ICET.2012.6375489, 2012, pp. 1-5. (Year: 2012).*

Sklavos et al., "Reconfigurable crypto processor design of encryption algorithms operation modes methods and FPGA integration", IEEE, doi: 10.1109/MWSCAS.2003.1562410, 2003, pp. 811-814 vol. 2. (Year: 2003).*

Lin et al., "Shell-Based Block Ciphering Structure (SBCS) for AES Parallelism with Feedback-Data Mode", IEEE, doi: 10.1109/CyberC.2014.19, 2014, pp. 48-55. (Year: 2014).*

International Search Report and Written Opinion of International Application No. PCT/US2019/055840, dated Jan. 23, 2020, 16 pp.

Ramamurthy et al., "Muller C-element Self-corrected Triple Modular Redundant Logic with Multithreading and Low Power Modes," IEEE, in Proceedings of 17th European Conference on Radiation and its Effects on Components and Systems (RADECS), Oct. 2-6, 2017, 4 pp.

Wang et al., "A partially reconfigurable architecture supporting hardware threads," IEEE, in Proceedings of 2012 International Conference on Field-Programmable Technology, Dec. 10-12, 2012, pp. 269-276.

Prosecution History from U.S. Appl. No. 16/157,265, dated Jun. 12 through Dec. 16, 2020, 41 pp.

International Preliminary Report on Patentability from International Application No. PCT/US2019/055840, dated Apr. 22, 2021, 10 pp.

* cited by examiner

MULTIMODE CRYPTOGRAPHIC PROCESSOR

CROSS REFERENCE

This application is a divisional application of and claims priority to U.S. patent application Ser. No. 16/157,265 filed on Oct. 11, 2018, which is hereby incorporated by reference herein in its entirety.

TECHNICAL FIELD

This disclosure relates to processing packets of information, for example, in the fields of networking, storage, and cryptography.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy.

Many devices within a computer network, e.g., storage/compute servers, firewalls, intrusion detection devices, switches, routers or other network attached devices, often use general purpose processors, including multi-core processing systems, to process data, such as network or storage data. However, general purpose processing cores and multi-processing systems are normally not designed for high-capacity network and storage workloads of modern networks and can be relatively poor at performing packet stream processing.

Further, cryptographic operations relating to security and other functions may require and/or consume substantial computing resources. In cryptography, the message to be transmitted is called plain text and the encrypted message is called cipher text. The algorithm used to encrypt and decrypt is called a cipher, and may involve significant processing and/or resources to implement. In symmetric ciphers, such as those used in Advanced Encryption Standard (AES) operations, the same key is used to encrypt as well as decrypt data. In an asymmetric cipher, different keys are used for encryption and decryption; the key used to encrypt or verify a signature is called a public key, and the key used to decrypt or sign is called a private key. To detect tampering by adversaries, a Message Authentication Code (MAC), which is a keyed hash of the cipher text or encrypted data, may also be transmitted along with the cipher text to enable the recipient to verify the validity or authenticity of the encrypted data.

SUMMARY

In general, this disclosure describes a highly programmable device, referred to generally as a data processing unit, having multiple processing units for processing streams of information, such as network packets or storage packets. In some examples, the processing units may be processing cores, and in other examples, the processing units may be virtual processors, hardware threads, hardware blocks, or other sub-processing core units. As described herein, the data processing unit includes one or more specialized hardware accelerators configured to perform acceleration for various data-processing functions.

This disclosure also describes techniques that include performing cryptographic operations (encryption, decryption, and generation of a message authentication code). Such techniques may include a security block (or security accelerator) of the data processing unit performing operations pursuant to any of multiple modes of the Advance Encryption Standard (AES). In some examples, the security block is implemented as a unified, multi-threaded, high-throughput encryption and decryption system for performing multiple modes of AES operations.

In particular, the security block may be configured to include a single, multistage, rolled-out AES pipeline having hardware to perform each of the ten, twelve, or fourteen rounds of operations typically performed in AES. In such an implementation, operations pursuant to some modes (e.g., those not involving some types of feedback) may be performed at high-throughput rates by feeding pipeline input data into the AES pipeline each cycle, and receiving pipeline output data from the AES pipeline after the input pipeline data is processed by each of the stages in the AES pipeline. However, feeding pipeline input data into the AES pipeline each cycle might be difficult for AES modes or algorithms involving feedback (i.e., where input is derived from the output of the multistage AES pipeline). To achieve sufficiently high throughput rates for AES modes involving feedback, the security block may operate using multiple threads to process other input data during otherwise idle times, thereby increasing the utilization of the security block and/or components of the security block. By using a thread-capable security block that includes a single rolled-out AES pipeline to perform multiple AES modes, a unified design may be used to perform multiple AES modes at high throughput rates. The unified design may simplify, streamline, and/or enable clean implementations of the logic required to implement multiple AES modes. As a result, the security block may be a more reliable, efficient, and/or cost-effective system for performing cryptographic operations.

In one example, this disclosure describes a device comprising: a plurality of key registers configured to receive a plurality of cryptographic keys; a multistage Advanced Encryption Standard (AES) pipeline configured to receive each of the plurality of cryptographic keys from the plurality of key registers; a plurality of data paths; a bit-shifting module; a delay buffer; and control logic for performing cryptographic operations pursuant to each of a plurality of AES modes, wherein the control logic is configured to perform each of the plurality of AES modes by using, for each of the AES modes, the Advanced Encryption Standard (AES) pipeline.

Although described primarily in terms of AES (also known as Rijndael), techniques in accordance with one or more aspects of the present disclosure may nevertheless apply to other encryption, decryption, and/or other cryptographic operation procedures or standards, including, generally, Data Encryption Standard (DES), Triple DES (TDES), Blowfish, Twofish, and/or any other pipelined block symmetric cipher or algorithm, procedure, system, or standard for performing cryptographic operations or for providing privacy and authentication for data communication or otherwise.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
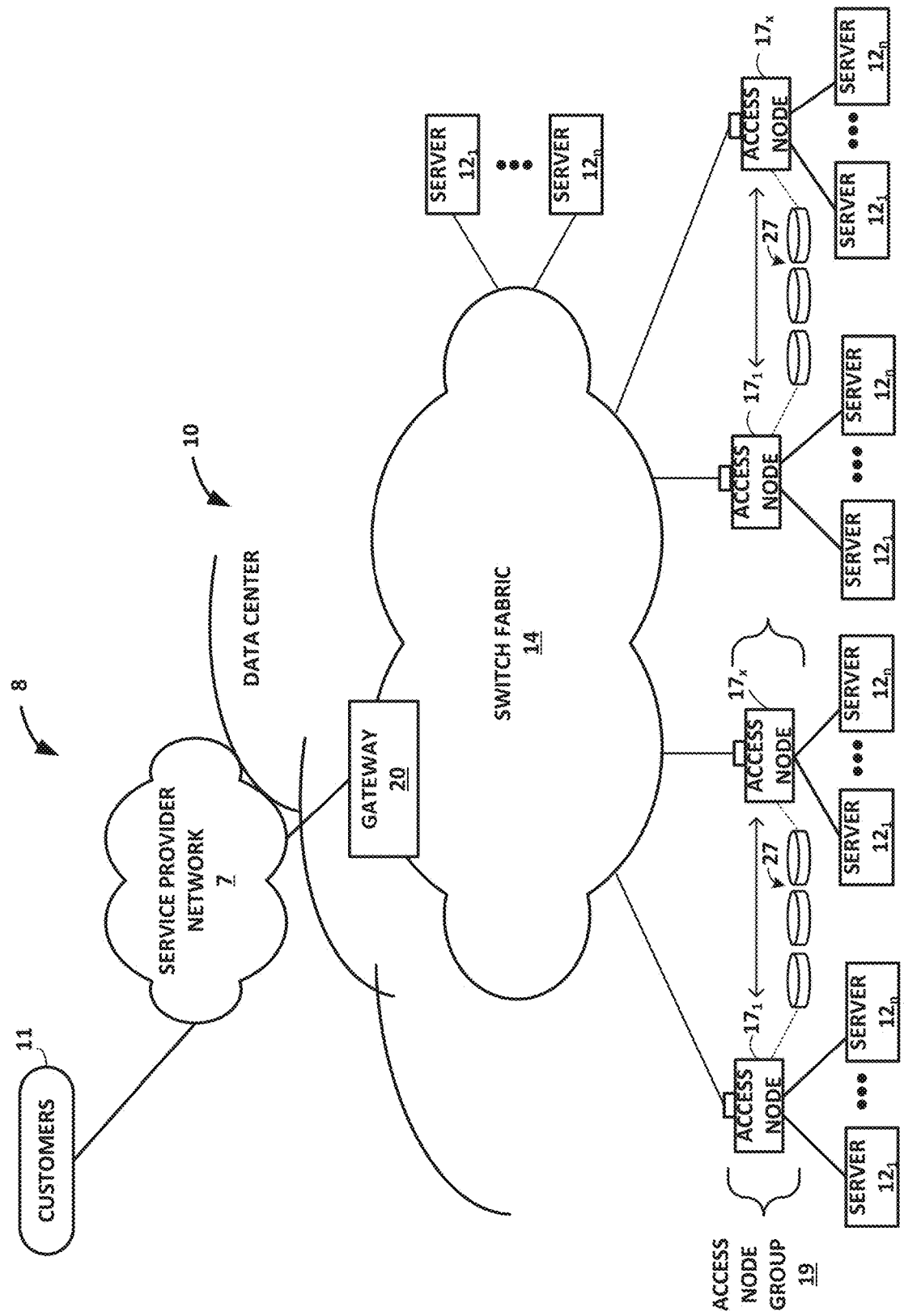
FIG. 1 is a block diagram illustrating an example system including one or more network devices configured to efficiently process a series of work units in a multiple core processor system, in accordance with the techniques of this disclosure.

FIG. 1 is a block diagram illustrating an example system 8 including one or more network devices configured to efficiently process a series of work units in a multiple core processor system. As described herein, techniques for efficient performance of cryptographic operations (e.g., encryption, decryption, and/or generation of secure hash values) may provide technical benefits that include reliably supporting multiple modes of operation with a streamlined, unified, and/or efficient design. Access nodes may also be referred to as data processing units (DPUs), or devices including DPUs, in this disclosure. In the example of FIG. 1, various data structures and processing techniques are described with respect to access nodes 17 within a data center 10. Other devices within a network, such as routers, switches, servers, firewalls, gateways and the like, having multiple core processor systems may readily be configured to utilize the data processing techniques described herein.

Data center 10 represents an example of a system in which various techniques described herein may be implemented. In general, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12N$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, each of servers 12 is coupled to switch fabric 14 by an access node 17 for processing streams of information, such as network packets or storage packets. In example implementations, access nodes 17 may be configurable to operate in a standalone network appliance having one or more access nodes. For example, access nodes 17 may be arranged into multiple different access node groups 19, each including any number of access nodes up to, for example, x access nodes $17_1$-$17X$. In other examples, each access node may be implemented as a component (e.g., electronic chip) within a device, such as a compute node, application server, storage server, and may be deployed on a motherboard of the device or within a removable card, such as a storage and/or network interface card.

In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as solid state drives (SSDs) and/or hard disk drives (HDDs), configured to provide network accessible storage for use by applications executing on the servers 12. In some examples, one or more of the SSDs may comprise non-volatile memory (NVM) or flash memory. Each access node group 19, including its set of access nodes 17 and storage devices 27, and the set of servers 12 supported by the access nodes 17 of that access node group 19 may be referred to herein as a network storage compute unit.

As further described herein, in one example, each access node 17 is a highly programmable I/O processor specially designed for offloading certain functions from servers 12. In one example, each access node 17 includes a number of internal processor clusters, each including two or more processing cores and equipped with hardware engines that offload cryptographic functions, compression and regular expression (RegEx) processing, data durability functions, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with, in some examples, zero copy in server memory) and storage acceleration for the attached server systems. In one example, each access node 17 may be implemented as one or more application-specific integrated circuit (ASIC) or other hardware and software components, each supporting a subset of the servers. In accordance with the techniques of this disclosure, any or all of access nodes 17 may include a data durability or similar accelerator unit. That is, one or more computing devices may include an access node including one or more data durability, data reliability, and/or erasure coding accelerator units, according to the techniques of this disclosure.

A security block or security accelerator unit of the access node, according to the techniques of this disclosure, may be configured to perform cryptographic operations on data received over the network and/or to be transmitted over the network. In some examples, the security block is capable of performing multiple modes of AES operations and/or various Secure Hash Algorithm (SHA) operations, including SHA-1, SHA-2, and/or SHA-3 operations. The security block may use a uniform, streamlined design to perform AES cryptographic operations pursuant to multiple AES modes in a high-throughput system. Similarly, the security block may use a uniform, streamlined design to perform multiple types of SHA operations (SHA-1, SHA-2, and SHA-3) with high throughput.

In the example of FIG. 1, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), data reliability (e.g., erasure coding), I/O offloading, and the like. In some examples, one or more of access nodes 17 may include storage devices, such as high-speed solid-state drives or rotating hard drives, configured to provide network accessible storage for use by applications executing on the servers. More details on the data center network architecture and interconnected access nodes illustrated in FIG. 1 are available in U.S. Provisional Patent Application No. 62/514,583, filed Jun. 2, 2017, entitled "Non-Blocking Any-to-Any Data Center Network with Packet Spraying Over Multiple Alternate Data Paths," the entire content of which is incorporated herein by reference.

Two example architectures of access nodes 17 are described below with respect to FIG. 2, FIG. 3, and FIG. 4. With respect to some or all of such examples, the architecture of each access node 17 comprises a multiple core processor system that represents a high performance, hyper-converged network, storage, and data processor and input/output hub. The architecture of each access node 17 is optimized for high performance and high efficiency stream processing.

A stream is defined as an ordered, unidirectional sequence of computational objects that can be of unbounded or undetermined length. In a simple example, a stream originates in a producer and terminates at a consumer, is operated on sequentially, and is flow-controlled. In some examples, a stream can be defined as a sequence of stream fragments, each representing a portion of data communicated by a stream. In one example, a stream fragment may include a memory block contiguously addressable in physical address space, an offset into that block, and a valid length. Streams can be discrete, such as a sequence of packets received from a network, or continuous, such as a stream of bytes read from a storage device. A stream of one type may be transformed into another type as a result of processing. Independent of the stream type, stream manipulation requires efficient fragment manipulation. An application executing on one of access nodes 17 may operate on a stream in three broad ways: the first is protocol processing, which consists of operating on control information or headers within the stream; the second is payload processing, which involves significant accessing of the data within the stream; and third is some combination of both control and data access.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within one of access nodes 17 can safely access different windows within the stream.

As described herein, data processing units of access nodes 17 may process stream information by managing "work units." In general, a work unit (WU) is a container that is associated with a stream state and used to describe (i.e. point to) data within a stream (stored in memory) along with any associated meta-data and operations to be performed on the data. In the example of FIG. 1, streams of data units may dynamically originate within a peripheral unit of one of access nodes 17 (e.g. injected by a networking unit, a host unit, or a solid state drive interface), or within a processor of the one of access nodes 17, in association with one or more streams of data, and terminate at another peripheral unit or another processor of the one of access nodes 17. Each work unit maintained by a data processing unit is associated with an amount of work that is relevant to the entity executing the work unit for processing a respective portion of a stream.

Stream processing is typically initiated as a result of receiving one or more data units associated with respective portions of the stream and constructing and managing work units for processing respective portions of the data stream. In protocol processing, a portion would be a single buffer (e.g. packet), for example. Within access nodes 17, work units may be executed by processor cores, hardware blocks, I/O interfaces, or other computational processing units. For instance, a processor core of an access node 17 executes a work unit by accessing the respective portion of the stream from memory and performing one or more computations in accordance with the work unit. A component of the one of access nodes 17 may receive, execute or generate work units. A succession of work units may define how the access node processes a flow, and smaller flows may be stitched together to form larger flows.

For purposes of example, DPUs within each access node 17 may execute an operating system, such as a general-purpose operating system (e.g., Linux or other flavor of Unix) or a special-purpose operating system, that provides an execution environment for data plane software for data processing. Moreover, each DPU may be configured to utilize a work unit (WU) stack data structure (referred to as a 'WU stack' in a multiple core processor system. As described herein, the WU stack data structure may provide certain technical benefits, such as helping manage an event driven, run-to-completion programming model of an operating system executed by the multiple core processor system. The WU stack, in a basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

As described herein, access nodes 17 may process WUs through a plurality of processor cores arranged as processing pipelines within access nodes 17, and such processing cores may employ techniques to encourage efficient processing of such work units and high utilization of processing resources. For instance, a processing core (or a processing unit within a core) may, in connection with processing a series of work units, access data and cache the data into a plurality of segments of a level 1 cache associated with the processing core. In some examples, a processing core may process a work unit and cache data from non-coherent memory in a segment of the level 1 cache. The processing core may also concurrently prefetch data associated with a work unit expected to be processed in the future into another segment of the level 1 cache associated with the processing core. By prefetching the data associated with the future work unit in advance of the work unit being dequeued from a work unit queue for execution by the core, the processing core may be able to efficiently and quickly process a work unit once the work unit is dequeued and execution of the work unit is to commence by the processing core. More details on work units and stream processing by data processing units of access nodes are available in U.S. Provisional Patent Application No. 62/589,427, filed Nov. 21, 2017, entitled "Work Unit Stack Data Structures in Multiple Core Processor System," and U.S. Provisional Patent Application No. 62/625,518, entitled "EFFICIENT WORK UNIT PROCESSING INA MULTICORE SYSTEM", filed Feb. 2, 2018, the entire contents of both being incorporated herein by reference.

As described herein, the data processing units for access nodes 17 includes one or more specialized hardware-based accelerators configured to perform acceleration for various data-processing functions, thereby offloading tasks from the processing units when processing work units. That is, each accelerator is programmable by the processing cores, and one or more accelerators may be logically chained together to operate on stream data units, such as by providing cryptographic functions, compression and regular expression (RegEx) processing, data durability functions, data storage functions and networking operations.

In FIG. 1, and in accordance with one or more aspects of the present disclosure, one or more of access nodes 17 may perform encryption, decryption, and/or secure hash operations. For instance, in the example of FIG. 1, access node 17-1 may receive data for transmission over switch fabric 14. Access node 17-1 may also identify a type of cryptographic operation to be performed on the data before transmission over switch fabric 14. In some examples, the type of operation may be an encryption or decryption operation. In other examples, the operation may involve generating a secure hash value or a MAC. Where the operation is an AES encryption or decryption operation, access node 17-1 may further identify a specific AES mode. Where the operation involves generating a MAC, access node 17-1 may alternatively identify whether that MAC is to be generated pursuant to the SHA-1, SHA-2, or SHA-3 algorithms.

Access node 17-1 may encrypt and transmit the data pursuant to the identified operation. For instance, in the example of FIG. 1, access node 17-1 determines that the data is to be encrypted using the AES algorithm in a particular mode associated with the AES standard. Access node 17-1 configures a security block included within access node 17-1 to perform encryption operations pursuant to the identified AES mode, and performs the operations to encrypt the data. Depending on the AES mode, access node 17-1 may perform the encryption using multiple threads of execution. Access node 17-1 then transmits the encrypted data over switch fabric 14 to the destination.

Similarly, access node 17-1 may decrypt data received over the network. For instance, still referring to FIG. 1, access node 17-1 receives, over switch fabric 14, one or more blocks of data. Access node 17-1 determines that the block of data is to be decrypted using the AES algorithm in a particular mode associated with the AES standard. Access node 17-1 configures the security block included within access node 17-1 to perform the decryption operations specified by the selected AES mode. Access node 17-1 performs the decryption operations using, for at least some AES modes, multiple threads of execution. Access node 17-1 then transmits the data to one of servers 12.

Figure 2:
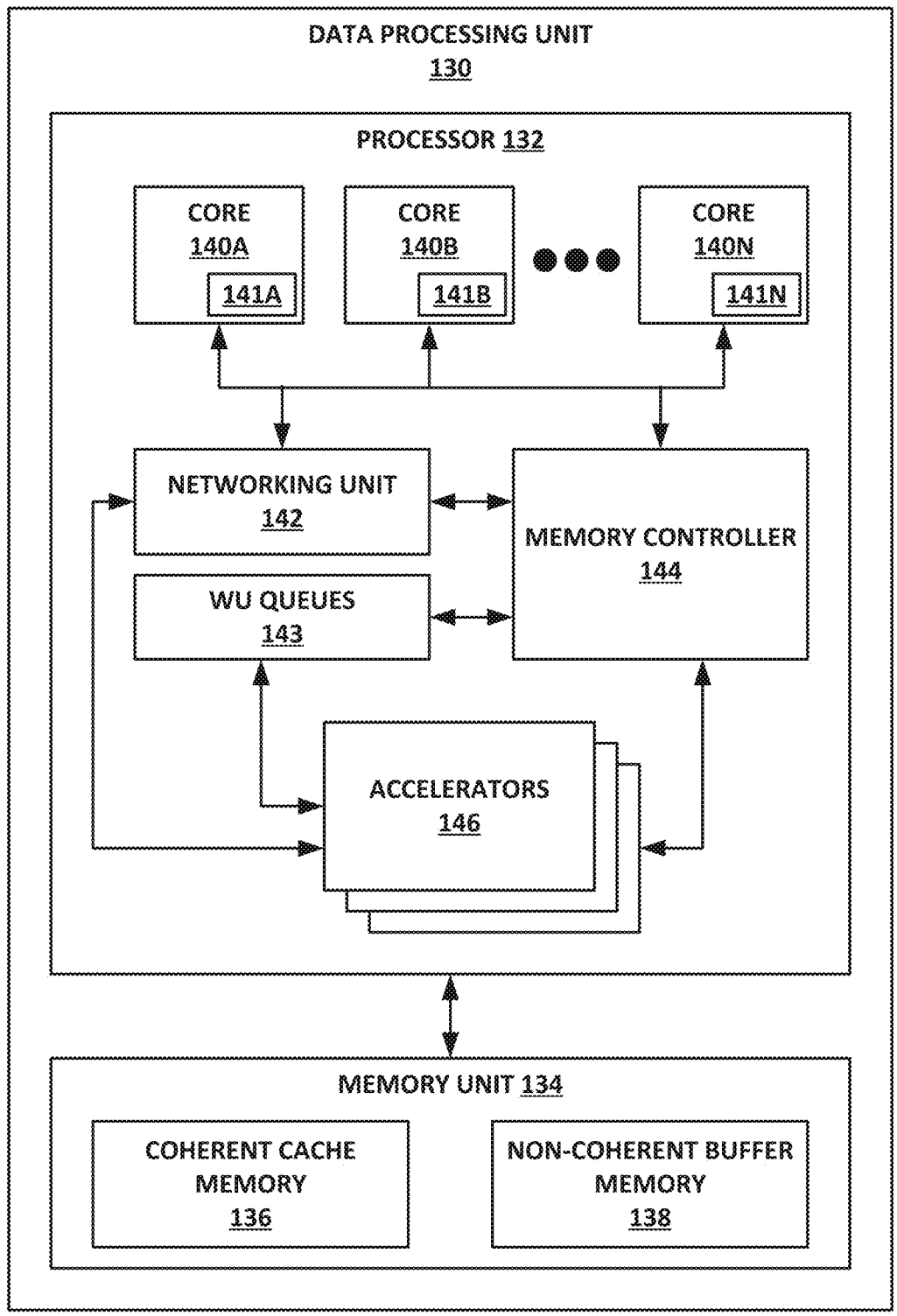
FIG. 2 is a block diagram illustrating an example data processing unit (DPU) including two or more processing cores, in accordance with the techniques of this disclosure.

FIG. 2 is a block diagram illustrating an example data processing unit (DPU) 130 including two or more processing cores, in accordance with the techniques of this disclosure. DPU 130 generally represents a hardware chip implemented in digital logic circuitry and may be used in any computing or network device. DPU 130 may operate substantially similar to and generally represent any of access nodes 17 of FIG. 1. Thus, DPU 130 may be communicatively coupled to one or more network devices, server devices (e.g., servers 12), random access memory, storage media (e.g., solid state drives (SSDs)), a data center fabric (e.g., switch fabric 14), or the like, e.g., via PCI-e, Ethernet (wired or wireless), or other such communication media. Moreover, DPU 130 may be implemented as one or more application-specific integrated circuit (ASIC), may be configurable to operate as a component of a network appliance or may be integrated with other DPUs within a device.

In the illustrated example of FIG. 2, DPU 130 includes a multi-core processor 132 having a plurality of programmable processing cores 140A-140N ("cores 140") coupled to an on-chip memory unit 134. Each of cores 140 includes a level 1 cache 141 (level 1 caches 141A, 141B, and 141N are associated with cores 140A, 140B, and 140N, respectively).

Memory unit 134 may include two types of memory or memory devices, namely coherent cache memory 136 and non-coherent buffer memory 138. Processor 132 also includes a networking unit 142, work unit (WU) queues 143, a memory controller 144, and accelerators 146. As illustrated in FIG. 2, each of cores 140, networking unit 142, WU queues 143, memory controller 144, memory unit 134, and accelerators 146 are communicatively coupled to each other. In some examples, processor 132 of DPU 130 further includes one or more accelerators (not shown) configured to perform acceleration for various data-processing functions, such as look-ups, matrix multiplication, cryptography, compression, regular expressions, or the like.

In this example, DPU 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. DPU 130 may also include one or more interfaces for connectivity to host devices (e.g., servers) and data storage devices, e.g., solid state drives (SSDs) via PCIe lanes. DPU 130 may further include one or more high bandwidth interfaces for connectivity to off-chip external memory.

Processor 132 further includes accelerators 146 configured to perform acceleration for various data-processing functions, such as look-ups, matrix multiplication, cryptography, compression, data durability and/or reliability, regular expressions, or the like. For example, accelerators 146 may comprise hardware implementations of look-up engines, matrix multipliers, cryptographic engines, compression engines, or the like. In accordance with the techniques of this disclosure, at least one of accelerators 146 represents a security block that may be used to perform a variety of cryptographic operations. In some examples, such a security block unit may be configured to perform AES and/or SHA operations in a number of different modes, using unified and streamlined logic to achieve high throughput rates for each of the modes.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. Provisional Patent Application No. 62/483,844, filed Apr. 10, 2017, and titled "Relay Consistent Memory Management in a Multiple Processor System," the entire content of which is incorporated herein by reference.

Cores 140 may comprise one or more microprocessors without interlocked pipeline stages (MIPS) cores, advanced reduced instruction set computing (RISC) machine (ARM) cores, performance optimization with enhanced RISC—performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

Each of level 1 caches 141 may include a plurality of cache lines logically or physically divided into cache segments. Each of level 1 caches 141 may be controlled by a load/store unit also included within the core. The load/store unit may include logic for loading data into cache segments and/or cache lines from non-coherent buffer memory 138 and/or memory external to DPU 130. The load/store unit may also include logic for flushing cache segments and/or cache lines to non-coherent buffer memory 138 and/or memory external to DPU 130. In some examples, the load/store unit may be configured to prefetch data from main memory during or after a cache segment or cache line is flushed.

As described herein, processor cores 140 may be arranged as processing pipelines, and such processing cores may employ techniques to encourage efficient processing of such work units and high utilization of processing resources. For instance, any of processing cores 140 (or a processing unit within a core) may, in connection with processing a series of work units retrieved from WU queues 143, access data and cache the data into a plurality of segments of level 1 cache 141 associated with the processing core. In some examples, a processing core 140 may process a work unit and cache data from non-coherent memory 138 in a segment of the level 1 cache 141. As described herein, concurrent with execution of work units by cores 140, a load store unit of memory controller 144 may be configured to prefetch, from non-coherent memory 138, data associated with work units within WU queues 143 that are expected to be processed in the future, e.g., the WUs now at the top of the WU queues and next in line to be processed. For each core 140, the load store unit of memory controller 144 may store the prefetched data associated with the WU to be processed by the core into a standby segment of the level 1 cache 141 associated with the processing core 140.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data and in some examples, prefetching into the cache of data associated with another work unit for future processing.

Figure 3:
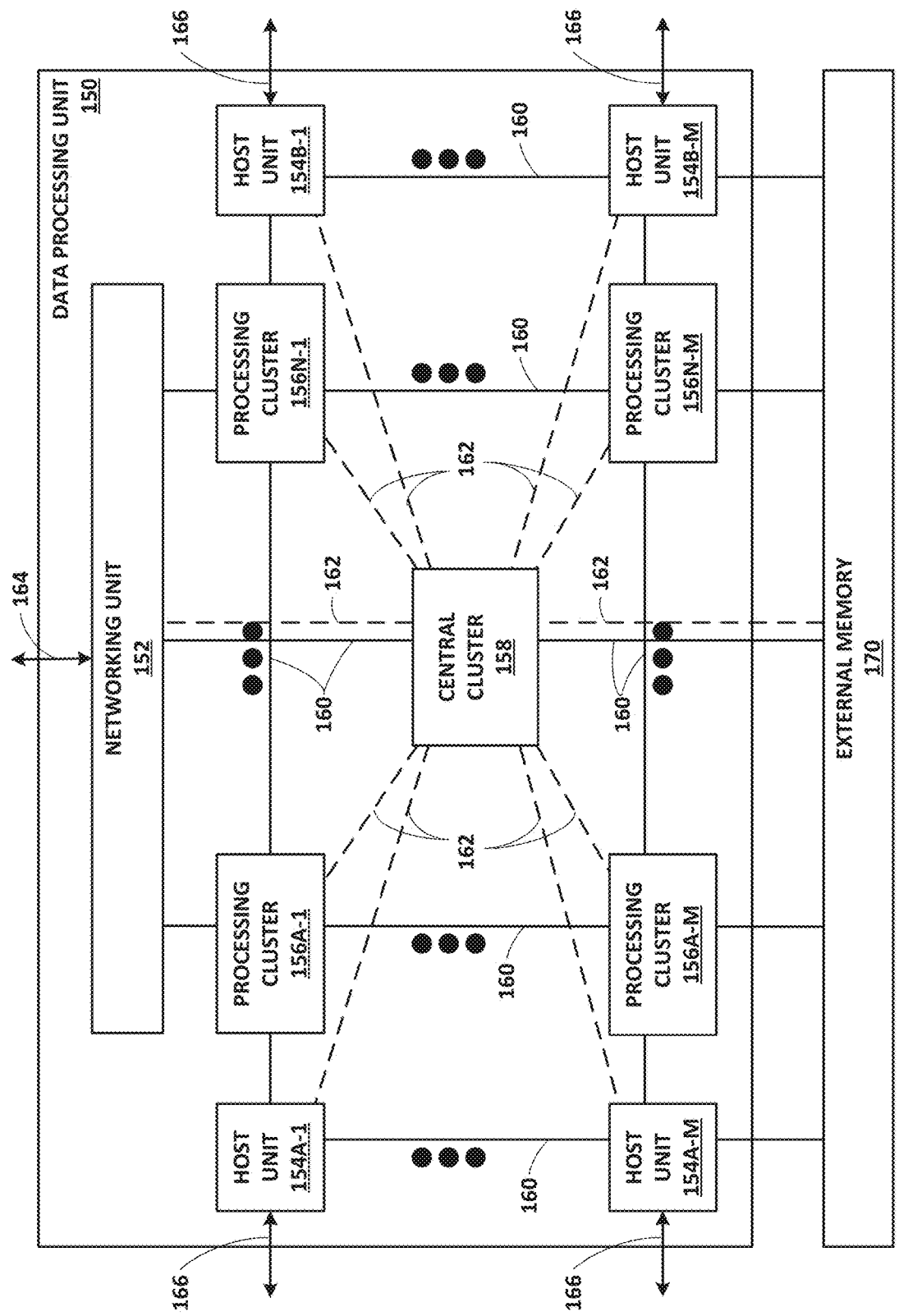
FIG. 3 is a block diagram illustrating another example of a DPU including two or more processing clusters, in accordance with the techniques of this disclosure.

FIG. 3 is a block diagram illustrating another example of a DPU 150 including two or more processing clusters, in accordance with the techniques of this disclosure. DPU 150 may operate substantially similar to any of the access nodes 17 of FIG. 1. Thus, DPU 150 may be communicatively coupled to a data center fabric (e.g., switch fabric 14), one or more server devices (e.g., servers 12), storage media (e.g., SSDs), one or more network devices, random access memory, or the like, e.g., via PCI-e, Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing, networking and/or storage device or installed on a card connected to the motherboard of the device.

In general, DPU 150 represents a high performance, hyper-converged network, storage, and data processor and input/output hub. As illustrated in FIG. 3, DPU 150 includes networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 150 to operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 150 provides optimizations for stream processing. DPU 150 executes an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

DPU 150 operates on work units (WUs) that associate a buffer with an instruction stream to reduce dispatching overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may be represented by a fixed length data structure, or message, including an action value and one or more arguments. In one example, a work unit message includes four words, a first word having a value representing an action value and three additional words each representing an argument. The action value may be considered a work unit message header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers.

In some examples, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of DPU 150, as further described in U.S. Patent Application Ser. No. 62/589,427, filed Nov. 21, 2017, the entire content of which is incorporated herein by reference.

As described herein, in some example implementations, load store units within processing clusters 156 may, concurrent with execution of work units by cores within the processing clusters, identify work units that are enqueued in WU queues for future processing by the cores. In some examples, WU queues storing work units enqueued for processing by the cores within processing clusters 156 may be maintained as hardware queues centrally managed by central cluster 158. In such examples, load store units may interact with central cluster 158 to identify future work units to be executed by the cores within the processing clusters. The load store units prefetch, from the non-coherent memory portion of external memory 170, data associated with the future work units. For each core within processing clusters 156, the load store units of the core may store the prefetched data associated with the WU to be processed by the core into a standby segment of the level 1 cache associated with the processing core.

Figure 4:
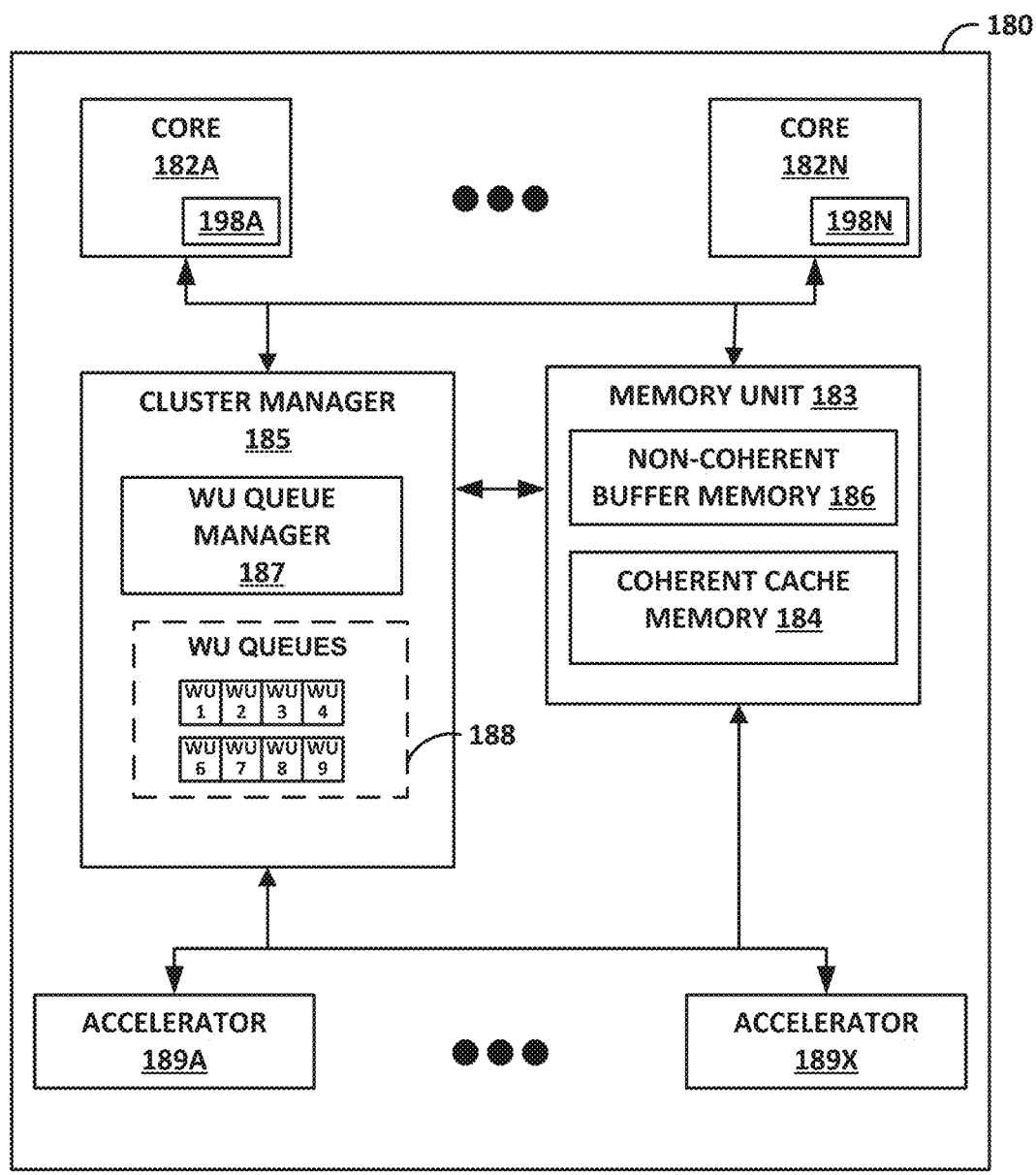
FIG. 4 is a block diagram illustrating an example processing cluster including two or more processing cores, in accordance with the techniques of this disclosure.

FIG. 4 is a block diagram illustrating an example processing cluster 180 including two or more processing cores 182A-182N. Each of processing clusters 156 of DPU 150 of FIG. 3 may be configured in a manner substantially similar to processing cluster 180 shown in FIG. 4. In the example of FIG. 4, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182 includes L1 buffer cache 198A and in general, core 182N includes L1 buffer cache 198N). In some examples, cluster manager 185 is alternatively located within central cluster 158, and/or WU queues 188 are alternatively maintained within central cluster 158 (e.g., within hardware registers of central cluster 158).

An access node or DPU (such as access nodes 17 of FIG. 1, DPU 130 of FIG. 2, or DPU 150 of FIG. 3) may support two distinct memory systems: a coherent memory system and a non-coherent buffer memory system. In the example of FIG. 4, coherent cache memory 184 represents part of the coherent memory system while non-coherent buffer memory 186 represents part of the non-coherent buffer memory system. Cores 182 may represent the processing cores discussed with respect to DPU 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression, data durability, regular expressions, or the like. That is, accelerators 189 may comprise hardware implementations of lookup engines, matrix multipliers, cryptographic engines, compression engines, data durability encoders and/or decoders, regular expression interpreters, or the like. For example, accelerators 189 may include a matrix multiplication engine, or a lookup engine that performs hash table lookups in hardware to provide a high lookup rate. A lookup engine, for example, may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression. Accelerators 189 may further include one or more security blocks for performing cryptographic operations, including encryption, decryption, and generation of authentication codes.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the DPU, which forwards the work unit to be queued in a virtual processor queue of WU queues 188.

As noted above, in accordance with the techniques of this disclosure, one or more of accelerators 189 may be configured to high-throughput cryptographic operations. A security accelerator of accelerators 189, in accordance with the techniques of this disclosure, may include processing circuitry capable of efficiently performing multiple types of cryptographic operations, which may, in some examples, involve performing operations pursuant to multiple AES modes or multiple SHA modes. Such a security accelerator may be capable of multithreaded operations in at least some of the modes, enabling all of the modes to achieve high throughput rates.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A.

Core 182A processes the work unit, which may involve accessing data, such as a network packet or storage packet, in non-coherent memory 156A and/or external memory 170. Core 182A may first look for the corresponding data in cache 198A, and in the event of a cache miss, may access the data from non-coherent memory 156A and/or external memory 170. In some examples, while processing the work unit, core 182A may store information (i.e., the network packet or data packet) associated with the work unit in an active segment of cache 198A. Further, core 182A may, while processing the work unit, prefetch data associated with a second work unit into a different, standby segment of cache 198A. When core 182A completes processing of the work unit, core 182A initiates (or causes initiation of) a cache flush for the active segment, and may also initiate prefetching of data associated with a third work unit (to be processed later) into that active segment. Core 182A (or a virtual processor within core 182A) may then swap the active segment and the standby segment so that the previous standby segment becomes the active segment for processing of the next work unit (i.e., the second work unit). Because data associated with the second work unit was prefetched into this now active segment, core 182A (or a virtual processor within core 182A) may be able to more efficiently process the second work unit. Core 182A then outputs corresponding results (possibly including one or more work unit messages) from performance of the work unit back through the interface unit of core 182A.

As described herein, in some example implementations, load store units within memory unit 183 may, concurrent with execution of work units by cores 182 within the processing cluster 180, identify work units that are enqueued in WU queues 188 for future processing by the cores. The load store units prefetch, from a non-coherent memory portion of external memory 170, data associated with the future work units and store the prefetched data associated with the WUs to be processed by the cores into a standby segment of the level 1 cache associated with the particular processing cores.

Figure 5:
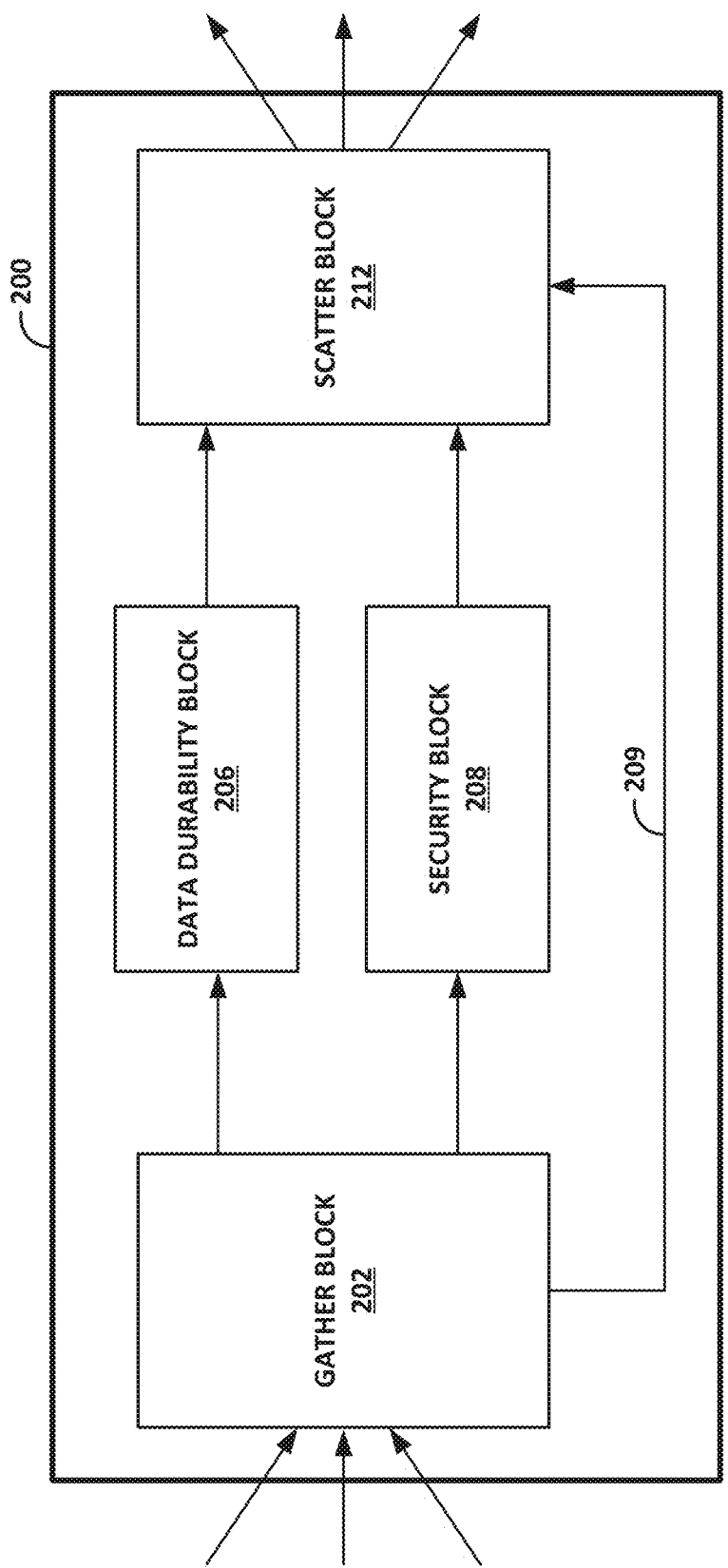
FIG. 5 is a block diagram illustrating an example accelerator, in accordance with one or more aspects of the present disclosure.

FIG. 5 is a block diagram illustrating an example accelerator, in accordance with one or more aspects of the present disclosure. In the example of FIG. 5, accelerator 200 may be one of accelerators 146 of data processing unit 130 from FIG. 2, or one of accelerators 189 of processing cluster 180 from FIG. 4. In some examples, accelerator 200 may be included in some or all of processing clusters 156 of data processing unit 150 illustrated in FIG. 3.

In the example of FIG. 5, accelerator 200 is configured to accelerate, improve, and/or modify operations relating to data durability and/or reliability that might otherwise be performed by software executing on a general purpose processor. As illustrated in FIG. 5, accelerator 200 may include one or more gather blocks 202, one or more data durability blocks 206, one or more security blocks 208, and one or more scatter blocks 212. Further, in some examples, other types of specific-function blocks, beyond data durability block 206 and security block 208, may also be included within accelerator 200. In addition, as illustrated in FIG. 5, pass-through connection 209 may also be included within accelerator 200. Data durability block 206 and security block 208 may each be implemented as a DMA inline accelerator positioned between gather block 202 and scatter block 212. For data durability block 206, gather block 202 may read a coefficient matrix and data fragments through gather commands, and scatter block 212 may write data fragments and/or parity fragments back to system memory through scatter software commands. Accordingly, gather block 202 may provide data accessed from an external memory, and may serve as an ingress DMA device. Scatter block 212 may send data back to external memory, and may serve as an egress DMA device. Further details relating to techniques for storage of data (e.g., block storage) to support inline erasure coding are available in U.S. Provisional Patent Application No. 62/597,185, filed Dec. 11, 2017, entitled "Durable Block Storage in Data Center Access Nodes with Inline Erasure Coding," the entire content of which is incorporated herein by reference.

Through these components and/or others described herein, accelerator 200 may support multiple different data durability or erasure coding schemes (e.g., through data durability block 206), enabling data to be reliably stored and retrieved from locations within data center 10. Accelerator 200 may also support security functions (e.g., through security block 208), enabling data received from gather block 202 to be encrypted and/or decrypted before being provided to scatter block 212.

In FIG. 5, and in accordance with one or more aspects of the present disclosure, accelerator 200 may encrypt, decrypt, and/or perform other cryptographic operations on data stored within processing cluster 180. For instance, in the example of FIG. 5 and with reference to FIG. 4, gather block 202 receives and gathers multiple streams of data from memory unit 183 within processing cluster 180. Gather block 202 outputs the gathered streams to security block 208. Security block 208 performs cryptographic operations on the data, performing one or more modes of AES encryption/decryption operations and/or performing secure hashing algorithms. Security block 208 outputs the processed data (e.g., encrypted or decrypted data) to scatter block 212. Scatter block 212 scatters the fragments across memory unit 183 within processing cluster 180. In some examples, security block 208 may perform simultaneous and/or concurrent cryptographic operations on different sets of data involving different AES operation modes, as further described herein.

Figure 6A:
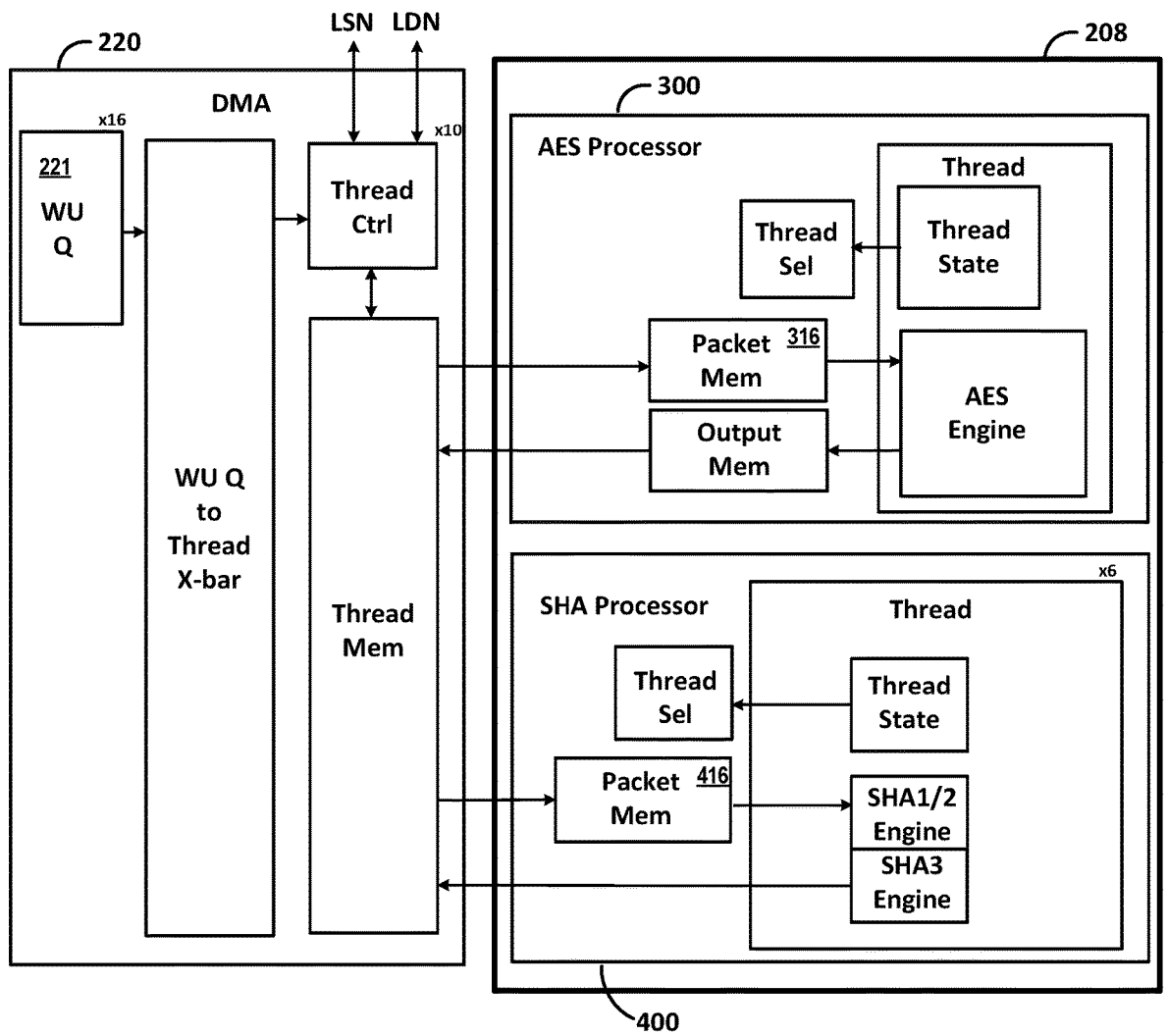
FIG. 6A is a conceptual diagram illustrating an example DMA block and an example security block in accordance with one or more aspects of the present disclosure.

FIG. 6A is a conceptual diagram illustrating an example DMA block and an example security block in accordance with one or more aspects of the present disclosure. In the example of FIG. 6A, DMA block 220 may generally correspond to and/or include functionality represented by gather block 202 and scatter block 212 of FIG. 5, and may include a number of components, including work unit queue 221. In FIG. 6A, security block 208 corresponds to security block 208 of FIG. 5, and includes AES processor 300 and SHA processor 400.

In the example of FIG. 6A, DMA block 220 may provide a number of commands, parameters, and/or data for security block 208 through two interfaces. In general, security block 208 processes flits and returns the corresponding output to DMA block 220 where DMA block 220 then scatters the results to memory as appropriate. In some examples, the interface between DMA block 220 and AES processor 300 may be fed by multiple threads fetching data in parallel. The interface between DMA block 220 and SHA processor 400 may also be fed by multiple threads fetching data in parallel. Each interface and corresponding DMA threads may be dedicated to different algorithms or modes performed by AES processor 300 and/or SHA processor 400. In some examples, some or all AES traffic is directed through the interface to AES processor 300, and some or all SHA traffic is directed to the other interface to SHA processor 400. Further, each DMA thread may correspond directly to a thread executing on either AES processor 300 or SHA processor 400. DMA block 220 and security block 208 may, in the example illustrated, each have a total of 10 threads with 4 used for AES traffic processed by AES processor 300 and 6 used for SHA traffic processed by SHA processor 400.

In some examples, each interface is credit based per thread. As data is received by AES processor 300, the data is written into packet memory 316 used to implement an input FIFO/thread. AES processor 300 then reads from packet memory 316 when needed. Similarly, as data is received by SHA processor 400, the data is written into packet memory 416, and read when needed. DMA block 220 receives packet information through WUs sent to work unit queues 221. Work unit queues 221 then issue the WUs to various threads for processing.

AES processor 300 performs cryptographic operations using multiple threads working on multiple packets that could each require different cipher modes. AES processor 300 further manages the interface with DMA block 220. DMA block 220 performs operations relating to scheduling packets to appropriate threads. Each AES thread, for example, maintains an input credit interface with DMA block 220, but they may all share a common 128-bit data and metadata interface. In some examples, each thread maintains its own 4-entry input FIFO in shared work unit queue 221. This depth may, in some examples, be adequate to absorb the round-trip latency of returning a credit and receiving the next 128-bit flit, thereby allowing for a continuous stream of input flits to be processed if a thread is able to consume them. The output interface is analogous to the input interface except in reverse. Additionally, deeper per-thread FIFOs may be required (e.g., 16-entry) in order to avoid stalling the pipeline. In such an example, a thread might have to check that space exists in the output FIFO prior to requesting access to the pipeline.

Figure 6B:
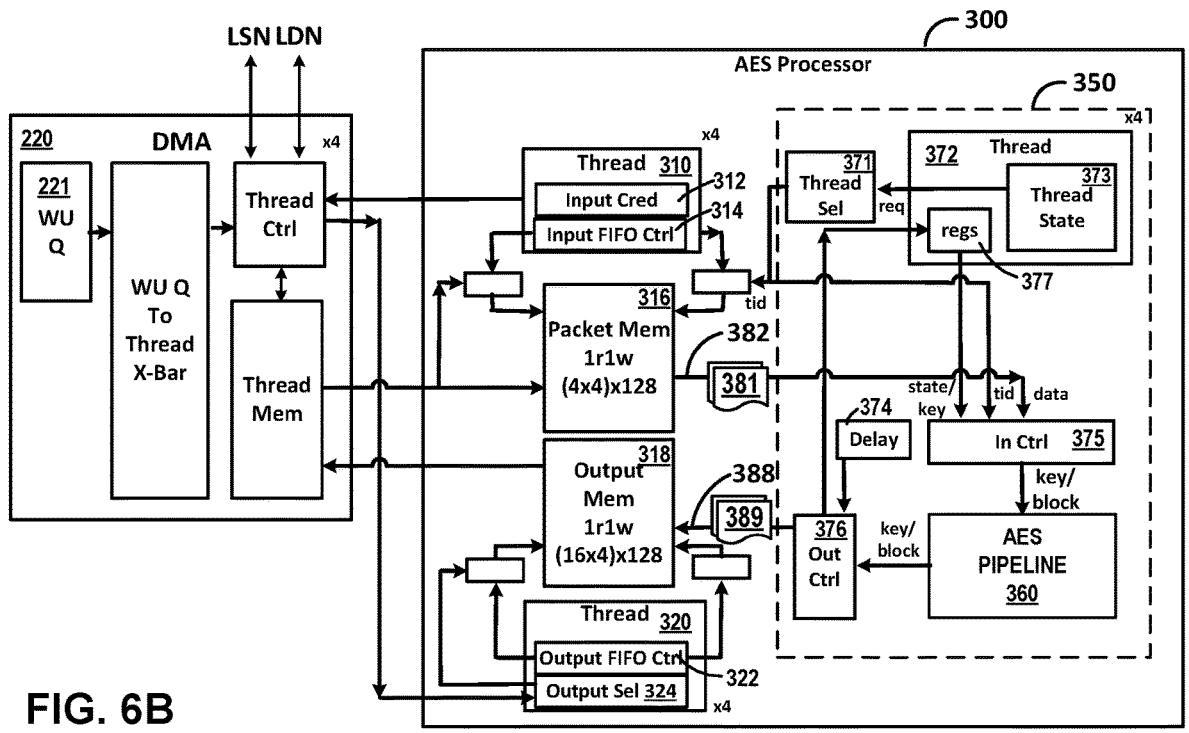
FIG. 6B is a conceptual diagram illustrating an example DMA block and a more detailed example AES processor, in accordance with one or more aspects of the present disclosure.

FIG. 6B is a conceptual diagram illustrating an example DMA block and a more detailed example AES processor, in accordance with one or more aspects of the present disclosure. As illustrated in FIG. 6B, AES processor 300 includes one or more sets of input thread logic 310, each with input credit logic 312 and input FIFO control block 314. AES processor 300 also includes one or more sets of output thread logic 320, each with output FIFO control block 322 and output thread selector 324. AES processor 300 further includes packet memory 316, which outputs input data 381 to AES block 350 over connection 382, and output memory 318, which receives mode output data 389 from AES block 350 over connection 388.

AES block 350 generates mode output data 389 from input data 381 after performing one or more of a variety of types (or modes) of AES processing. AES block 350 includes one or more sets of thread logic 372, each with registers 377 and thread state logic 373. AES block 350 further includes thread selector 371, delay pipeline 374, pipeline input control logic 375, pipeline output control logic 376 and AES pipeline/AES engine 360.

In the example of FIG. 6B, AES block 350 performs both encrypt/decrypt and authentication functions using a common AES pipeline 360. AES pipeline 360 may include a separate encrypt and decrypt pipeline that share staging registers. Such an implementation may prevent encrypt and decrypt blocks from being processed in parallel. In the example shown, and as further described in connection with FIG. 6D, AES pipeline 360 is a 14-cycle pipeline that can accept a new 128-bit block each cycle. The key length can be 128, 192, or 256. AES pipeline 360 may be configured so that all key lengths will take the same number of cycles. AES pipeline 360 may also support multiple modes of operation, as described herein.

In the example of FIG. 6B, a single memory is used as storage for all thread input FIFOs. Since AES pipeline 360 may process one block of input per cycle, blocks can easily be read from packet memory 316 and sent directly to AES pipeline 360. Each thread may have a FIFO control block (input FIFO control blocks 314) that maintain pointers/full/empty for their input FIFO. When a corresponding FIFO is not empty, and the thread is in a state the requires data, each of input FIFO control blocks 314 may request access to the memory.

Thread selector 371 is responsible for keeping track of when the thread can send a new block through the pipeline. A request does not necessarily result in a block proceeding through the pipeline. Access to the packet data generally also typically is also be serialized. For example, when loading a key, the key is retrieved from the packet interface and written to the key memory. When it is ready to be used, it is read from the key memory and sent to into the processing pipe with the block input.

AES pipeline 360 implements the AES encrypt algorithm, transforming a 128B block of input data by performing the same set of operations over a number of rounds (10, 12, or 14, for 128, 192, or 256-bit keys, respectively). If AES block 350 is implemented as a threaded system, the design may be streamlined and/or simplified if the pipeline has a fixed latency, regardless of key size. In one example design, all key sizes will pass through 14 rounds, but 128-bit keys will perform no operation for the first 4 rounds, and 192-bit keys will perform no operation for the first 2 rounds. Such an implementation adds latency to 128 and 192-bit key operations, but it may nevertheless be appropriate because the resulting pipeline design may be clean, simplified, and efficient. The rounds may be unwound (typically with one round per pipe stage) to provide the desired bandwidth. Each round is furnished with a 128-bit round-specific key, derived from the initial 128, 192, or 256-bit key.

The round keys may be derived from the initial key at the time that the initial key is loaded and then reused for each block encrypted with that key. However, with a threaded pipeline, this would require storage for 128 bits times 15 (the number of rounds plus one) times the number of threads. Furthermore, each unwound round might need access to the round key for its current thread in parallel with all other rounds. This method also imposes some additional latency and complexity to run the key expansion algorithm prior to encryption.

Alternatively, the key for each round may be derived on-the-fly from the previous round in a feed-forward fashion. Such an implementation may eliminate the start-up latency and require only 256 bits times the number of threads (to hold each thread's initial key) plus 256 bits times the number of pipe stages (to hold the key expansion state through the pipeline). Assuming that the number of threads is equal to the number of pipe stages, this yields an approximately four-fold reduction in storage (256*2*8 vs 256*8*8).

Such a scheme may pose a problem for decryption, which generally would provide the round keys in reverse order to encryption. However, the key expansion algorithm may be run in reverse given the final key expansion state, so each round key may still be generated on-the-fly in the correct (reverse) order. During tunnel setup, the initial key is typically transformed into the final key expansion state, either in software, or by using the key expansion capability of the encrypt pipeline. The final state of the key expansion pipeline may be captured and used as the initial key for the decrypt pipeline, as further described in connection with FIG. 7B.

In the example of FIG. 6B, each per-thread output thread logic 320 includes output FIFO control block 322 and output thread selector 324. In some examples, each thread begins with 16 credits and decrements by one credit for every output block. As the blocks are popped from the output FIFO, the credit is returned to the appropriate thread. Because in some examples, only one block will be written/read to/from the FIFOs per cycle, all FIFOs may reside in a single 128×129 two-port RAM. If credits are available, the thread will request access to the interface between DMA block 220 and AES processor 300. When granted, the block will be read from the FIFO and output on the interface. Normally, AES processor 300 will not accumulate output since it may be scattered.

Figure 6C:
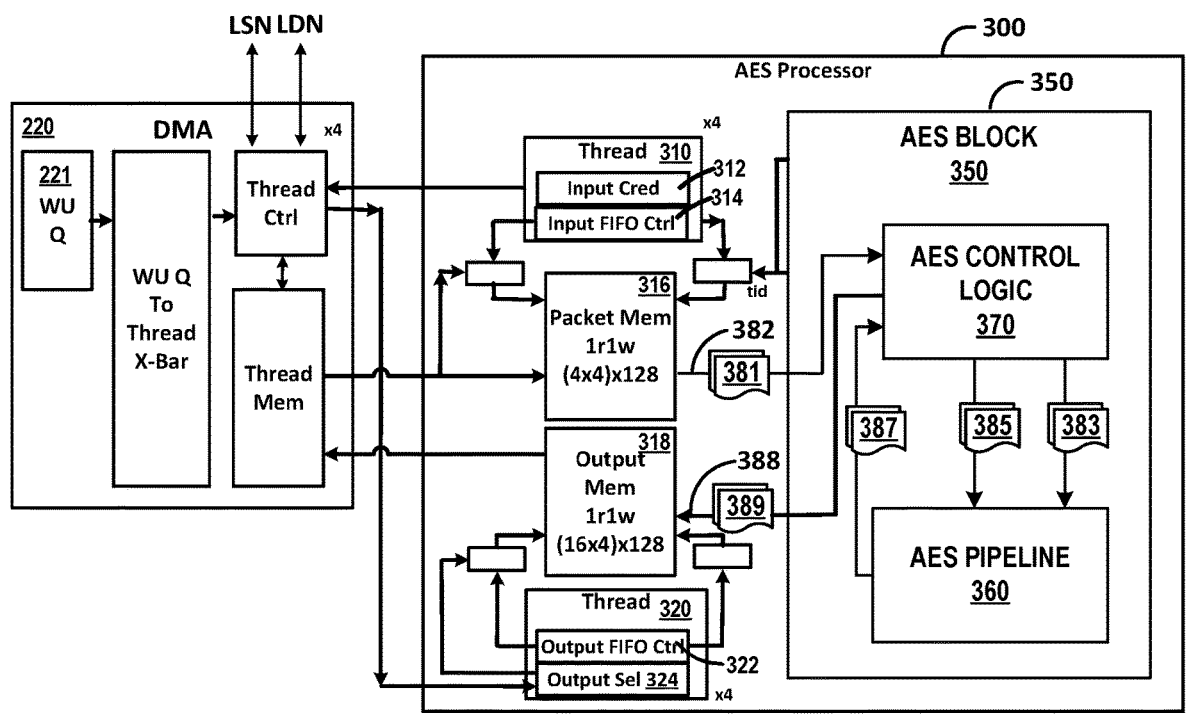
FIG. 6C is a conceptual diagram illustrating an example AES processor, which includes an example AES block, in accordance with one or more aspects of the present disclosure.

FIG. 6C is a conceptual diagram illustrating an example AES processor, which includes an example AES block, in accordance with one or more aspects of the present disclosure. In the example of FIG. 6C, AES block 350 includes AES control logic 370 and AES pipeline 360. AES pipeline 360 of FIG. 6C corresponds to AES pipeline 360 of FIG. 6B, and some or all of the remaining logic included within AES block 350 of FIG. 6B is represented in FIG. 6C as AES control logic 370.

In the illustration of FIG. 6C, AES control logic 370 receives, from packet memory 316, input data 381. AES control logic 370 processes input data 381 and outputs, to AES pipeline 360, key 383 and pipeline input data 385. AES pipeline 360 processes pipeline input data 385 based on key 383 and outputs, to AES control logic 370, pipeline output data 387. AES control logic 370 receives pipeline output data 387 from AES pipeline 360, and processes pipeline output data 387 to generate mode output data 389. AES control logic 370 outputs mode output data 389 to output memory 318.

AES block 350 is capable of operating in a number of different modes associated with AES processing. Each mode defines how AES block 350 processes input data 381 to generate mode output data 389. Some modes describe a method to use the AES pipeline for encryption/decryption. Some modes describe a method to use the AES pipeline for authentication. And some modes describe a method to calculate both. For instance, AES block 350 is capable of performing encryption and decryption operations pursuant to a modes that include the ECB (Electronic Codebook) mode (see NIST SP800-38A), the CTR (Counter) mode, the CBC (Cipher Block Chaining) mode, the GCM/GHASH (Galois Counter Mode) mode (see NIST SP800-38D), the XTS (CipherText Stealing) mode (see NIST SP800-38E), and the CCM (Counter with CBC-MAC) mode.

Each mode typically requires additional logic outside of AES pipeline 360 to properly set up or process pipeline input data 385 for processing by AES pipeline 360. In addition, each mode may require additional logic to properly process pipeline output data 387 (received from AES pipeline 360) before generating mode output data 389. In the example of FIG. 6C, the additional logic for performing both types of processing is encompassed by AES control logic 370. In many cases, much of the control logic is pipelined and shared between the threads. Some of modes require state information to be saved on a per-thread basis. AES block 350 is also capable of performing operations pursuant to any of such modes at any time. In some examples, AES block 350 may be performing one or more operations pursuant to one mode while simultaneously and/or concurrently performing one or more operations pursuant to a different mode.

In some examples, each work unit associated with data to be processed by AES block 350 may include an opcode that specifies an AES mode associated with an AES operation to be performed by AES block 350. In other examples, the mode to be used for cryptographic operations involving any particular data can be specified in another way, such as through a configuration setting (e.g., stored within one or more registers 377 and/or pipeline input control logic 375), or through user input.

Figure 6D:
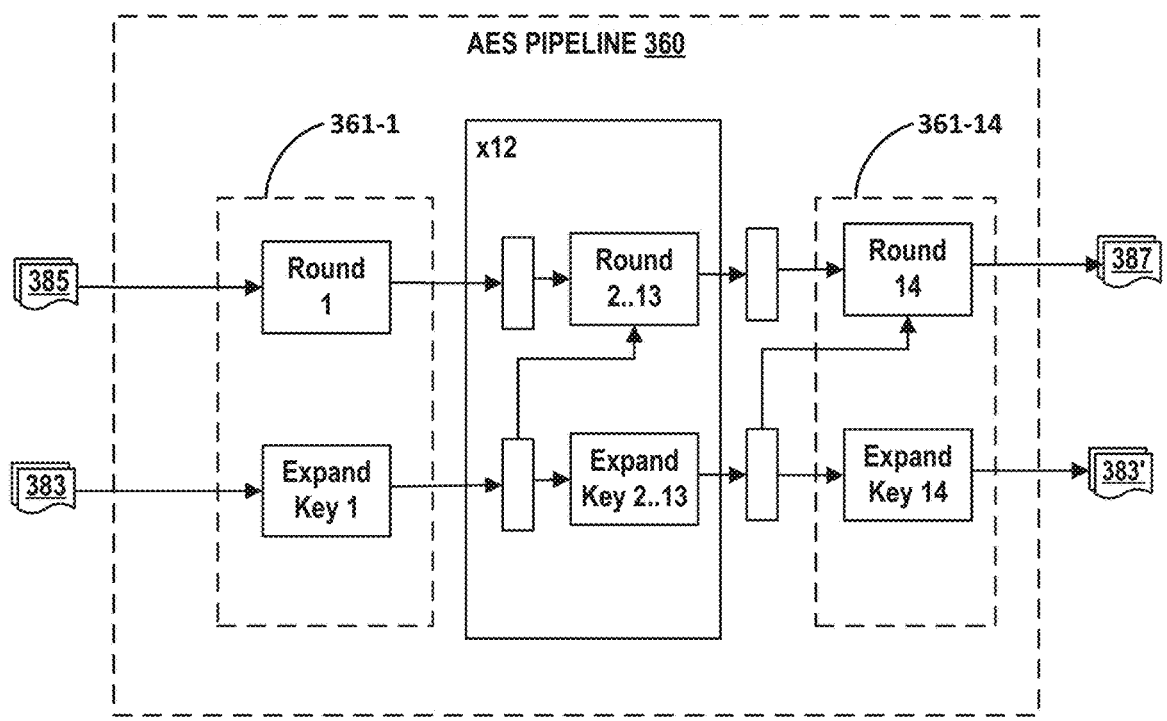
FIG. 6D is a conceptual diagram illustrating an example AES pipeline, in accordance with one or more aspects of the present disclosure.

FIG. 6D is a conceptual diagram illustrating an example AES pipeline, in accordance with one or more aspects of the present disclosure. AES pipeline 360 of FIG. 6D may correspond to AES pipeline 360 of FIG. 6B and FIG. 6C. As illustrated, AES pipeline 360 includes fourteen stages (stage 361-1 to stage 361-14) in a pipeline. Typically, the AES algorithm requires 10, 12, or 14 rounds of operations for performing cryptographic functions. For AES-128, 10 rounds are required. For AES-192, 12 rounds are required. And for AES-256, 14 rounds are required. Each round may be processed in a separate pipeline stage. In the example of FIG. 6D, and to allow for a consistent pipeline depth, all AES variations take 14 cycles to be processed. AES pipeline 360 accepts as input key 383 and pipeline input data 385. Pipeline input data 385 may be plaintext/unencrypted data or encrypted data. AES pipeline 360 outputs pipeline output data 387 and decryption key 383'. If pipeline input data 385 is plaintext or unencrypted data, 387 is encrypted or ciphertext data. If pipeline input data 385 is encrypted data, pipeline output data 387 is unencrypted data or plain text.

Accordingly, with an input block size of 128 bits, completing one block per cycle at 1 GHz may produce a maximum raw throughput of 128 Gbps. In order to achieve 128 Gbps throughput, AES pipeline 360 would typically start processing a new block in every cycle. In other words, for each cycle, stage 361-1 would process data, output the processed data to stage 361-2, and accept a new block of data for processing. Depending on the AES cipher mode being performed by AES block 350, this is not always easy to do, because in some situations, that new block of data is not yet available. For example, and as further described below, a mode that requires feedback might have to wait until AES pipeline 360 fully processes an initial set of data through all stages in the pipeline before that initial set of data can be processed by AES pipeline 360 to produce a final set of data. This type of feedback may introduce a significant delay in processing, since it may require waiting for multiple stage pipeline operation (e.g., a 14-cycle delay) to complete before further processing.

To achieve the desired throughput in AES modes involving feedback that would otherwise result in delays, AES block 350 may employ multithreaded processing. In such an implementation, multiple threads are used to ensure that aspects of AES block 350, including AES pipeline 360 and AES control logic 370 included within AES block 350, operate at a high utilization. For example, with reference to FIG. 6B, each set of input thread logic 310, output thread logic 320, and thread logic 372 and may be implemented on a per-thread basis (e.g., one set of thread logic 372 for each thread, one set of input thread logic 310 for each thread, and one set of output thread logic 320 for each thread). Further, by using a multi-threaded implementation, it is possible to implement a high-throughput AES block 350 using only a single AES pipeline 360. Using a single AES pipeline 360 simplifies the design of AES processor 300 and may result in a more configurable AES processor 300 that also operates more reliably. Since there are fourteen stages in AES pipeline 360, fourteen threads may be considered a practical upper limit of the number of threads. However, some AES modes do allow for back-to-back processing of data blocks without feedback, so fourteen threads might not be required in some implementations. In the implementation illustrated in FIG. 6A, FIG. 6B, and FIG. 6C, only four threads are used for AES processing.

In accordance with one or more aspects of the present disclosure, AES block 350 may access mode selection data. For instance, with reference to FIG. 6B and FIG. 6C, mode selection data is derived from an opcode included in one or more work units within work unit queue 221. In the example of FIG. 6C, AES control logic 370 may have accessed the mode selection data within packet memory 316 and stored the mode selection data within one or more registers 377. Accordingly, AES control logic 370 may access mode selection data in one or more registers 377. AES control logic 370 of AES block 350 accesses mode selection data to determine which of the AES modes of operation to select for processing data.

AES block 350 may encrypt data received from packet memory 316. For instance, with reference to FIG. 6C and FIG. 6D, AES control logic 370 receives unencrypted input data 381 over connection 382 from packet memory 316. AES control logic 370 processes input data 381, according to the selected AES mode, to generate pipeline input data 385. AES control logic 370 outputs pipeline input data 385 to AES pipeline 360, along with a per-thread key (i.e., key 383) associated with pipeline input data 385. AES pipeline 360 processes pipeline input data 385 by passing the data, using key 383, through each of stages 361 as illustrated in FIG. 6D. AES pipeline 360 produces pipeline output data 387 and outputs pipeline output data 387 back to AES control logic 370. AES control logic 370 may further process pipeline output data 387 to generate encrypted mode output data 389. AES control logic 370 outputs encrypted mode output data 389 over connection 388 to output memory 318.

Similarly, AES block 350 may decrypt data received from packet memory 316. For instance, again with reference to FIG. 6C and FIG. 6D, AES control logic 370 receives encrypted input data 381 over connection 382 from packet memory 316. AES control logic 370 processes input data 381, according to the selected AES mode, to generate pipeline input data 385. AES control logic 370 outputs pipeline input data 385 to AES pipeline 360, along with key 383. AES pipeline 360 processes pipeline input data 385 by processing pipeline input data 385 through each of stages 361 using key 383, thereby decrypting pipeline input data 385. As a result, AES pipeline 360 produces pipeline output data 387 and outputs unencrypted pipeline output data 387 back to AES control logic 370. AES control logic 370 may further process unencrypted pipeline output data 387 to generate mode output data 389. AES control logic 370 outputs the unencrypted mode output data 389 over connection 388 to output memory 318.

Figure 7A:
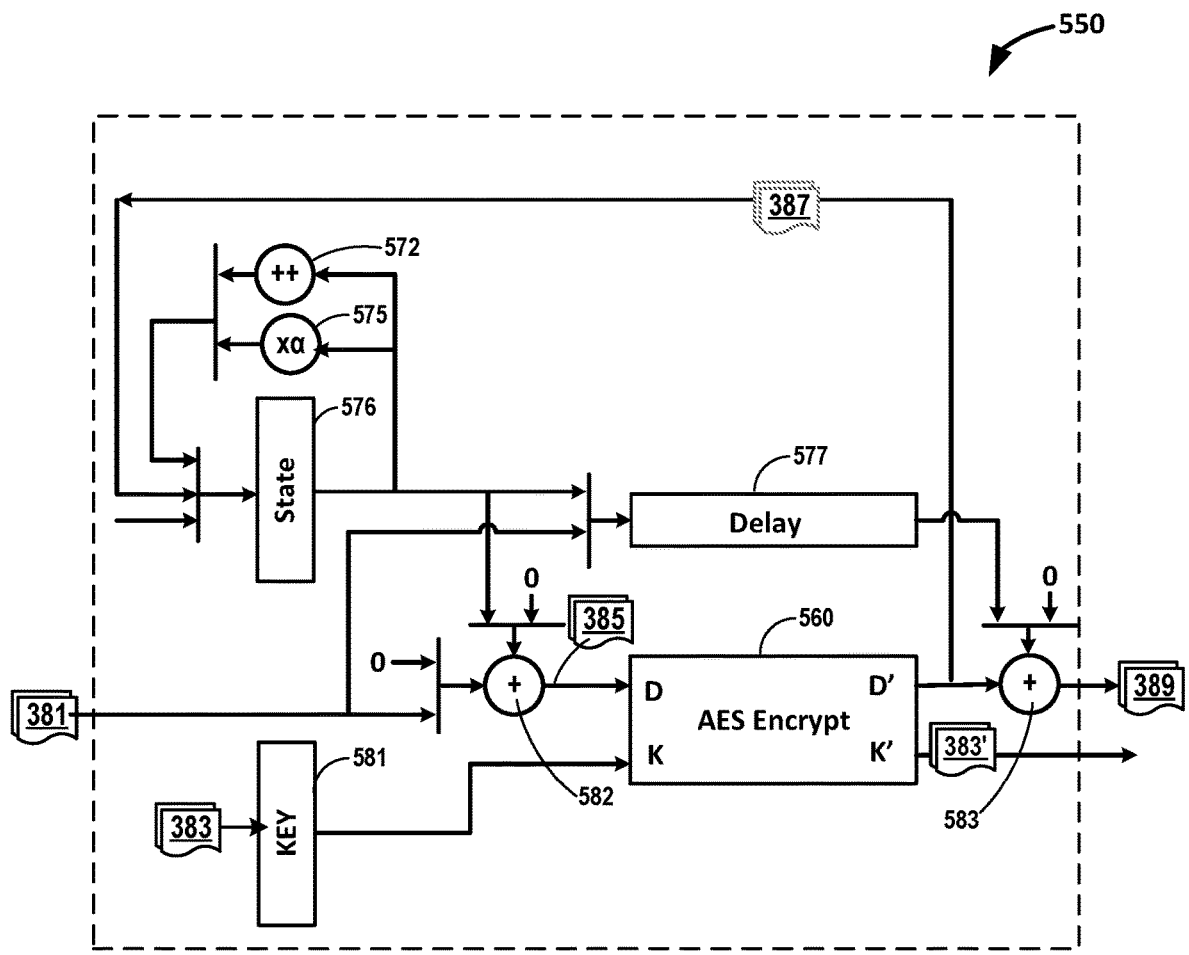
FIG. 7A is a conceptual diagram illustrating an example AES block which may perform multiple modes of AES encryption operations, in accordance with one or more aspects of the present disclosure.

FIG. 7A is a conceptual diagram illustrating an example AES block which may perform multiple modes of AES encryption operations, in accordance with one or more aspects of the present disclosure. FIG. 7A illustrates AES block 550, which represents a unified, multi-threaded, high-throughput encryption system for performing any of multiple modes of AES encryption. AES block 550 may be an example implementation of AES block 350 of FIG. 6A, FIG. 6B, and FIG. 6C. Each of FIG. 7B through FIG. 7F illustrate how AES block 550 of FIG. 7A may be reconfigured to perform a specific AES encryption mode. In some examples, some or all of the components within control logic 370 are capable of being selectively disabled by configuration logic (which may be logic included within AES control logic 370, or may be other logic located elsewhere). Accordingly, in some examples, configuration logic within AES control logic 370 causes the appropriate functional components included within control logic 370 to be selectively disabled or enabled, based on the appropriate configuration for a given AES encryption mode.

In FIG. 7A, AES block 550 accepts unencrypted input data 381 over connection 382 and generates encrypted mode output data 389 using key 383. AES block 550 outputs mode output data 389 over connection 388 to other components within an AES processor, such as AES processor 300 of FIG. 6A, FIG. 6B, and FIG. 6C. AES block 550 of FIG. 7A includes increment block 572, multiplication block 575, one or more state registers 576, delay pipeline 577, one or more key registers 581, exclusive-or ("XOR") block 582, and XOR block 583. In the example of FIG. 7A, each of key registers 581 and state registers 576 are per-thread registers, one for each thread. AES block 550 also includes AES encryption pipeline 560, which may correspond to the encryption capabilities provided by AES pipeline 360 of FIG. 6D. Key 383 undergoes expansion within AES encryption pipeline 560, and the final round key (e.g., outputted by stage 361-14 of FIG. 6D) may be saved and used as the initial key for decryption, as further described in connection with FIG. 7B. In some examples, each of state registers 576 are 128 bits wide, and hold feedback state such as the CBC initialization vector (IV), the CBC feedback, the CTR counter, or the XTS tweak.

Figure 7B:
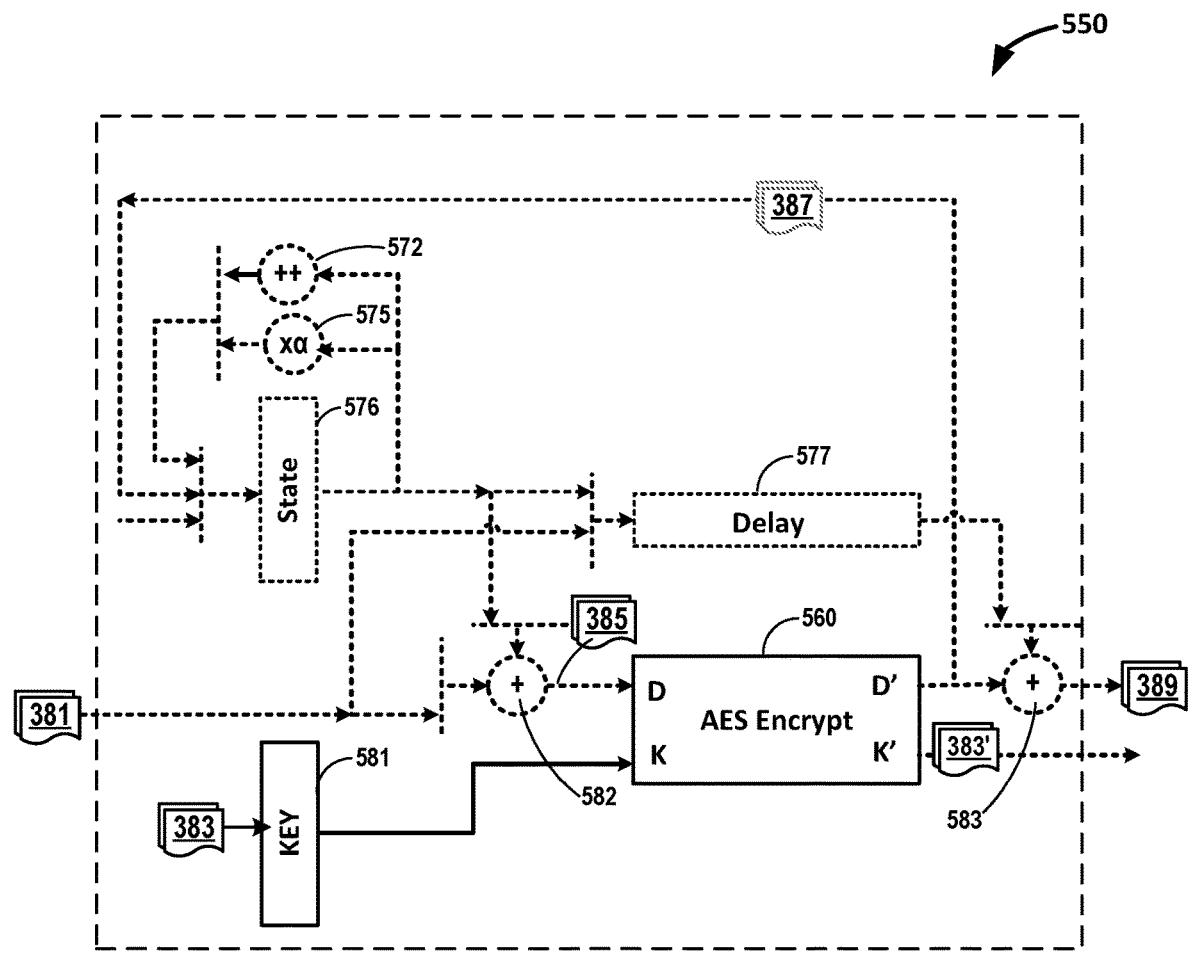
FIG. 7B is a conceptual diagram, derived from FIG. 7A, illustrating AES decryption key generation, in accordance with one or more aspects of the present disclosure.

FIG. 7B is a conceptual diagram, derived from FIG. 7A, illustrating AES decryption key generation, in accordance with one or more aspects of the present disclosure. AES encryption and decryption are very similar operations which generally may permit implementation with a common pipeline, such as AES encryption pipeline 560. In FIG. 7B, many of the components within AES block 550 are not used or are disabled during decryption key generation. Some of the components not used include increment block 572, multiplication block 575, state registers 576, and delay pipeline 577. Accordingly, in FIG. 7B, they are shown as faded or grayed-out in FIG. 7B.

One exception to the similarity between encryption and decryption, however, relates to the key schedule. Each round of the AES algorithm requires a round key that is generated from the original key in a process called key expansion. Each round key is a variation of the previous round key so each successive round key can be calculated in each pipeline stage starting with the original key. For decryption, the key schedule is reversed. That is, the final key generated by the key schedule is the first round key required for decryption. Therefore, the complete key schedule needs to be calculated prior to starting decryption, which is a procedure that might not automatically fit into a system using a pipelined AES engine, such as AES encryption pipeline 560.

However, the key schedule is reversible. Starting with the final key, each previous key in the key schedule can be calculated. Therefore, by starting with the final round key, calculating each round key needed for decryption can be processed by AES encryption pipeline 560 in a manner similar to encryption.

In order to start with the final round key, AES block 550 may first perform key expansion using the configuration shown in FIG. 7B. FIG. 7B illustrates the components of AES block 550 used for performing key expansion, and shows as faded or grayed-out the remaining components of AES block 550, which are not used for key expansion. Although performing key expansion may involve some additional overhead, it might be performed only a small number of times (e.g., once for each tunnel established).

Accordingly, in FIG. 7B, key 383 is input into key register 581. Key register 581 outputs key 383 to AES encryption pipeline 560, which performs key expansion using a dummy input block (pipeline input data 385). When AES encryption pipeline 560 finishes completing each of the rounds (e.g., stage 361-1 through stage 361-14 of FIG. 6D), AES encryption pipeline 560 outputs decrypt key 383', which represents the final round key. AES block 550 writes key 383 to output memory 318 (see FIG. 6C).

Figure 7C:
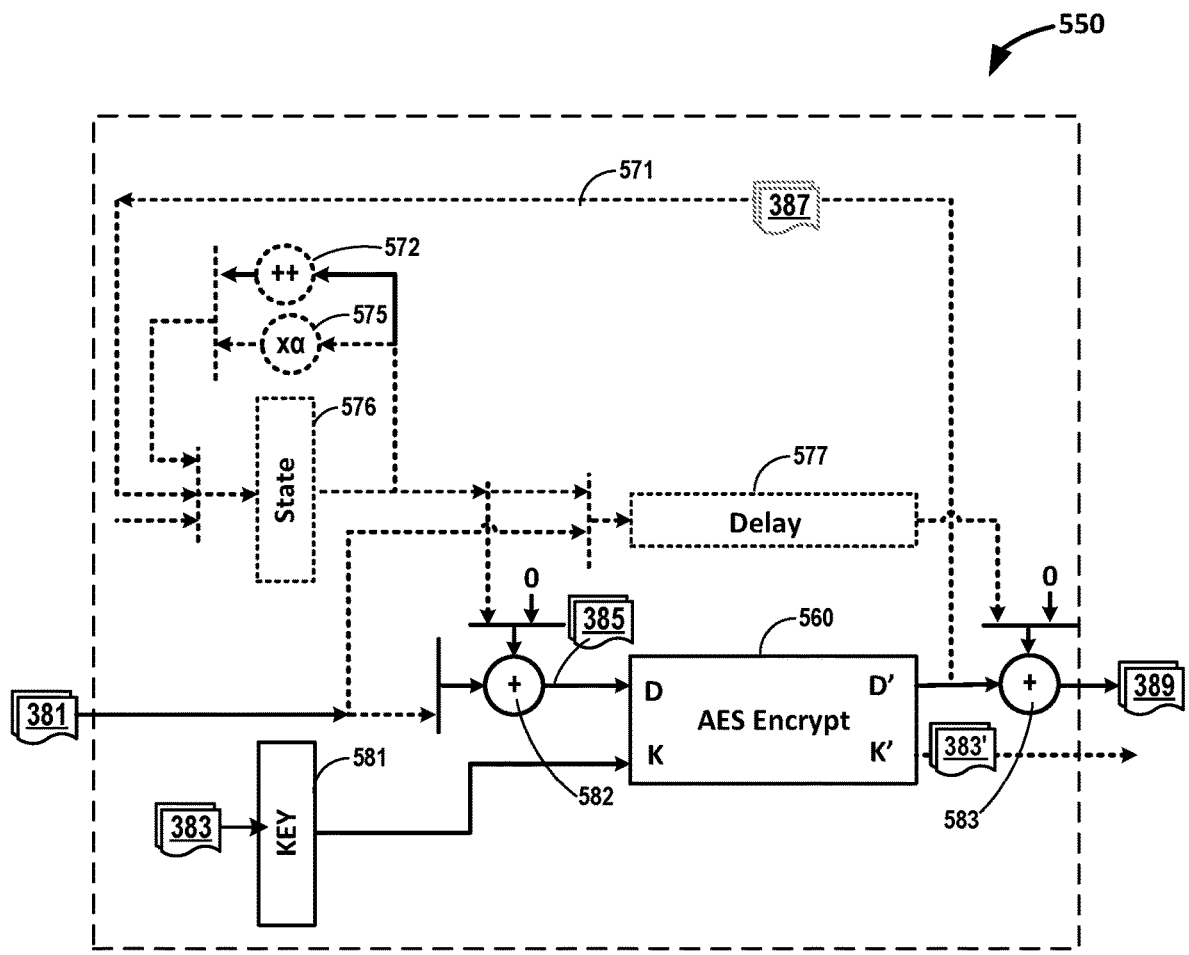
FIG. 7C is a conceptual diagram, derived from FIG. 7A, illustrating AES encryption in AES ECB mode, in accordance with one or more aspects of the present disclosure.

FIG. 7C is a conceptual diagram, derived from FIG. 7A, illustrating AES encryption in AES ECB mode, in accordance with one or more aspects of the present disclosure. In FIG. 7C, none of increment block 572, multiplication block 575, state registers 576, and delay pipeline 577 are used (and are thus faded or grayed-out in FIG. 7C).

In the example of FIG. 7C, AES block 550 may encrypt input data 381 to generate encrypted mode output data 389. For instance, with reference to FIG. 7C, each block of plaintext data (e.g., unencrypted input data 381) to be encrypted is processed by XOR block 582 with 0, so that it is unchanged (i.e., an exclusive-or operation of "n" and 0 always results in "n"). XOR block 582 feeds the result into AES encryption pipeline 560 with key 383 from key register 581. AES encryption pipeline 560 generates, after some number cycles (e.g., fourteen cycles), encrypted data. AES encryption pipeline 560 feeds the encrypted data into XOR block 583, where it is processed with the value of 0 (so that it is unchanged). XOR block 583 outputs the result as mode output data 389.

Figure 7D:
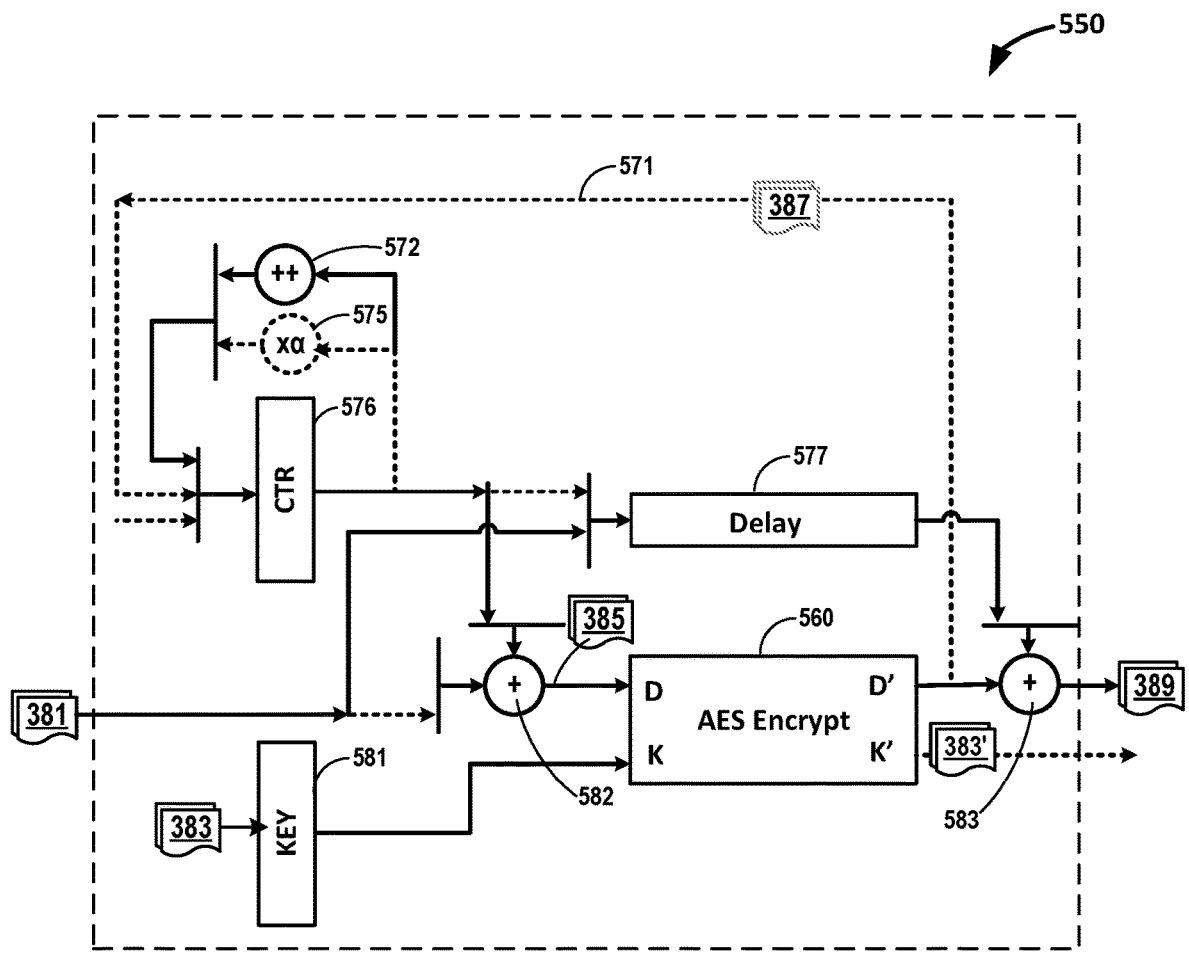
FIG. 7D is a conceptual diagram, derived from FIG. 7A, illustrating both AES encryption and decryption in AES CTR mode, in accordance with one or more aspects of the present disclosure.

FIG. 7D is a conceptual diagram, derived from FIG. 7A, illustrating both AES encryption and decryption in AES CTR mode, in accordance with one or more aspects of the present disclosure. In FIG. 7D, state register 576 holds a counter value. Incrementing the value held in state register 576 is typically an operation that can be easily performed in one cycle. Therefore, to the extent that there is any feedback in AES block 550 of FIG. 7D, it does not present a delay of more than one cycle. Accordingly, in this AES CTR mode, only a single thread is required to keep the pipeline highly utilized. Note that, although only a single thread is required in this mode, the DMA engine, and other modes, may require multiple threads. In that situation, AES block 550 may nevertheless operate in a multithreaded manner to accommodate such operations.

In the example of FIG. 7D, AES block 550 may process input data 381 to generate encrypted mode output data 389. For instance, with reference to FIG. 7D, increment block 572 increments, on each cycle, the counter value stored in state register 576 and feeds it back to state register 576. XOR block 582 performs an XOR operation on state register 576 and 0 (resulting in no change) and feeds the result into AES encryption pipeline 560. XOR block 582 feeds the result into AES encryption pipeline 560 with key 383 from key register 581. AES encryption pipeline 560 generates, after some number cycles (e.g., fourteen cycles), encrypted data. Delay pipeline 577 delays input data 381 by the same number of cycles. AES encryption pipeline 560 feeds the encrypted data into XOR block 583, where it undergoes an XOR operation with the output of delay pipeline 577, thereby producing mode output data 389.

For encryption operations, unencrypted input data 381 is fed into delay pipeline 577, so the result of the operation performed by XOR block 583 is encrypted mode output data 389. Decryption operations follow almost an identical procedure, except that encrypted input data 381 is fed into delay pipeline 577, so the result of the operation performed by XOR block 583 is unencrypted mode output data 389.

Figure 7E:
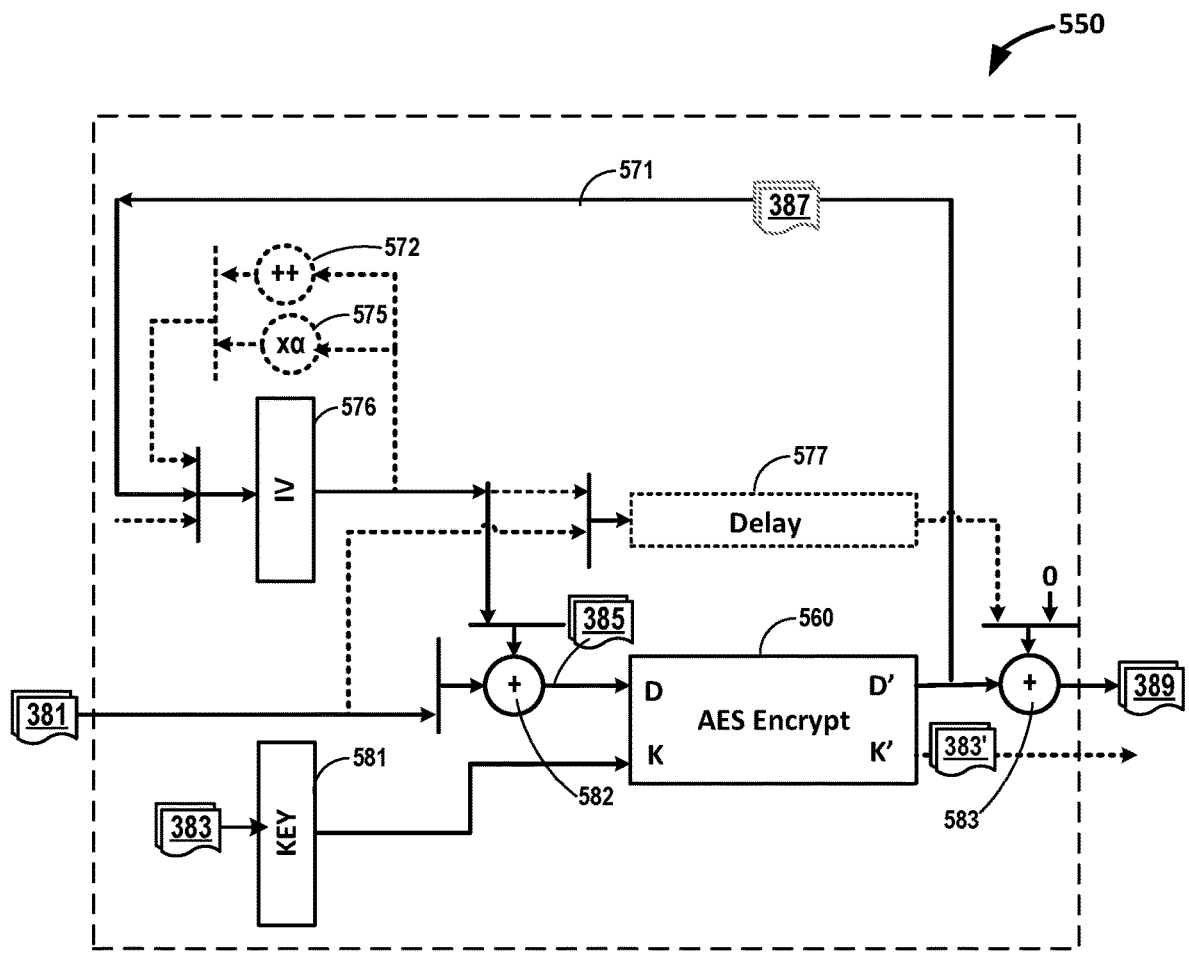
FIG. 7E is a conceptual diagram, derived from FIG. 7A, illustrating AES encryption in AES CBC mode, in accordance with one or more aspects of the present disclosure.

FIG. 7E is a conceptual diagram, derived from FIG. 7A, illustrating AES encryption in AES CBC mode, in accordance with one or more aspects of the present disclosure. CBC mode may be used for CBC cipher encryption, but CBC mode may also be used when generating an XCBC message authentication code (MAC) or hash. In FIG. 7C, state register 576 holds the initialization vector (IV) for the initial block, and the cipher feedback for subsequent blocks.

In the example of FIG. 7E, AES block 550 may encrypt input data 381 to generate encrypted mode output data 389. For instance, with reference to FIG. 7E, XOR block 582 performs an XOR operation on the contents of state register 576 and input data 381. XOR block 582 feeds the results into AES encryption pipeline 560, resulting in encrypted pipeline output data 387. Pipeline output data 387 is fed back (over feedback loop 571) into state register 576. XOR block 582 performs another XOR operation on the contents of state register 576 and the next set or block of input data 381. Eventually, XOR block 583 performs an XOR operation on the final pipeline output data 387 and 0, resulting in encrypted mode output data 389.

The feedback loop referenced above may force the next set or block of input data 381 to wait until the previous set of pipeline output data 387 (generated from the previous set of input data 381) to emerge from AES encryption pipeline 560 and be fed back into state register 576. This may result in a multicycle delay. Specifically, if AES encryption pipeline 560 is a 14-cycle pipeline, the delay might be as long as 14 cycles. To mitigate such a delay, at least some aspects of AES block 550 (e.g., AES encryption pipeline 560) may be operated in a multithreaded manner, so that higher utilization of AES block 550 may be achieved.

Note that AES-XCBC is a MAC, and not a cipher, but is presumably used in conjunction with a cipher. If an AES cipher is selected in conjunction with AES-XCBC (as is the case with CCM), then encryption (and decryption modes that use the encrypt pipeline) will require 2 passes through the pipeline (once for the cipher, and once for the MAC), which will halve the throughput. For XCBC-MAC, only the final output block is used.

Figure 7F:
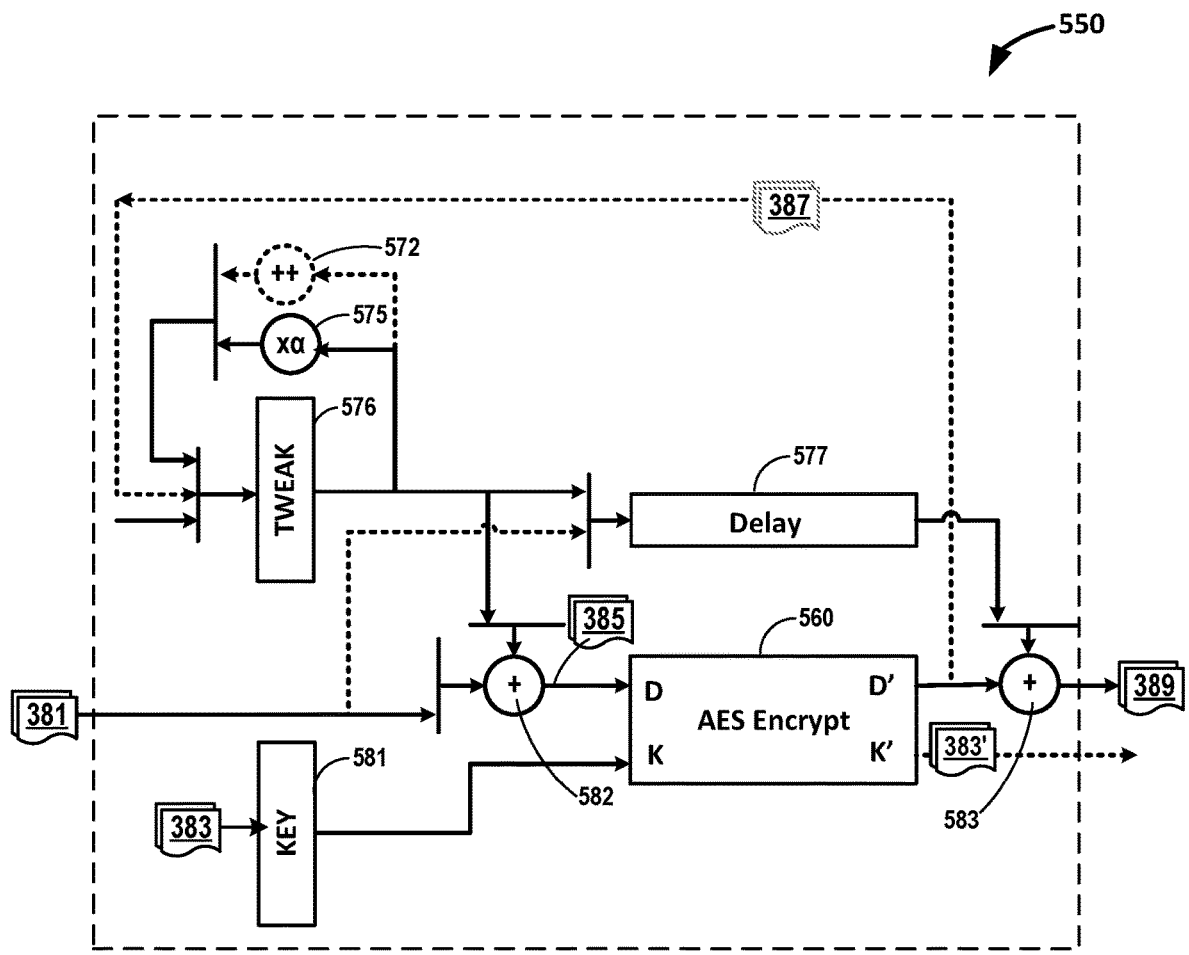
FIG. 7F is a conceptual diagram, derived from FIG. 7A, illustrating AES encryption in AES XTS mode, in accordance with one or more aspects of the present disclosure.

FIG. 7F is a conceptual diagram, derived from FIG. 7A, illustrating AES encryption in AES XTS mode, in accordance with one or more aspects of the present disclosure. In FIG. 7F, state register 576 holds an encrypted tweak value, which was generated by a prior AES encryption operation (not shown). In some examples, this encrypted tweak value may be generated by using the ECB mode with the resulting pipeline output data 387/mode output data 389 deposited back into state register 576 via the feedback path.

In the example of FIG. 7F, AES block 550 may encrypt input data 381 to generate encrypted mode output data 389. For instance, with reference to FIG. 7F, multiplication block 575 multiplies the contents of state register 576 by a (e.g., multiplication block 575 performs a 1-bit left shift with the most significant bit feeding back to a handful of XOR taps). The result of multiplication block 575 is fed back into state register 576. XOR block 582 performs an XOR operation on the contents of state register 576 and unencrypted input data 381. The result of XOR block 582 is fed into AES encryption pipeline 560 with key 383. AES encryption pipeline 560 outputs encrypted data some number of cycles later. XOR block 583 performs an XOR operation on the encrypted data with the output of delay pipeline 577, which is the same tweak value that has been delayed to match the latency of AES encryption pipeline 560. The result is encrypted mode output data 389.

The operation performed by multiplication block 575 (i.e., the multiplication by a) is simple enough that new values can be generated as fast as the AES-encrypt pipeline can absorb them. Therefore, a single thread will suffice to keep the engine highly utilized in this mode. However, the ciphertext stealing in the penultimate and ultimate blocks introduces a CBC-style feedback dependency, as discussed in connection with FIG. 9A and FIG. 9B.

Figure 8A:
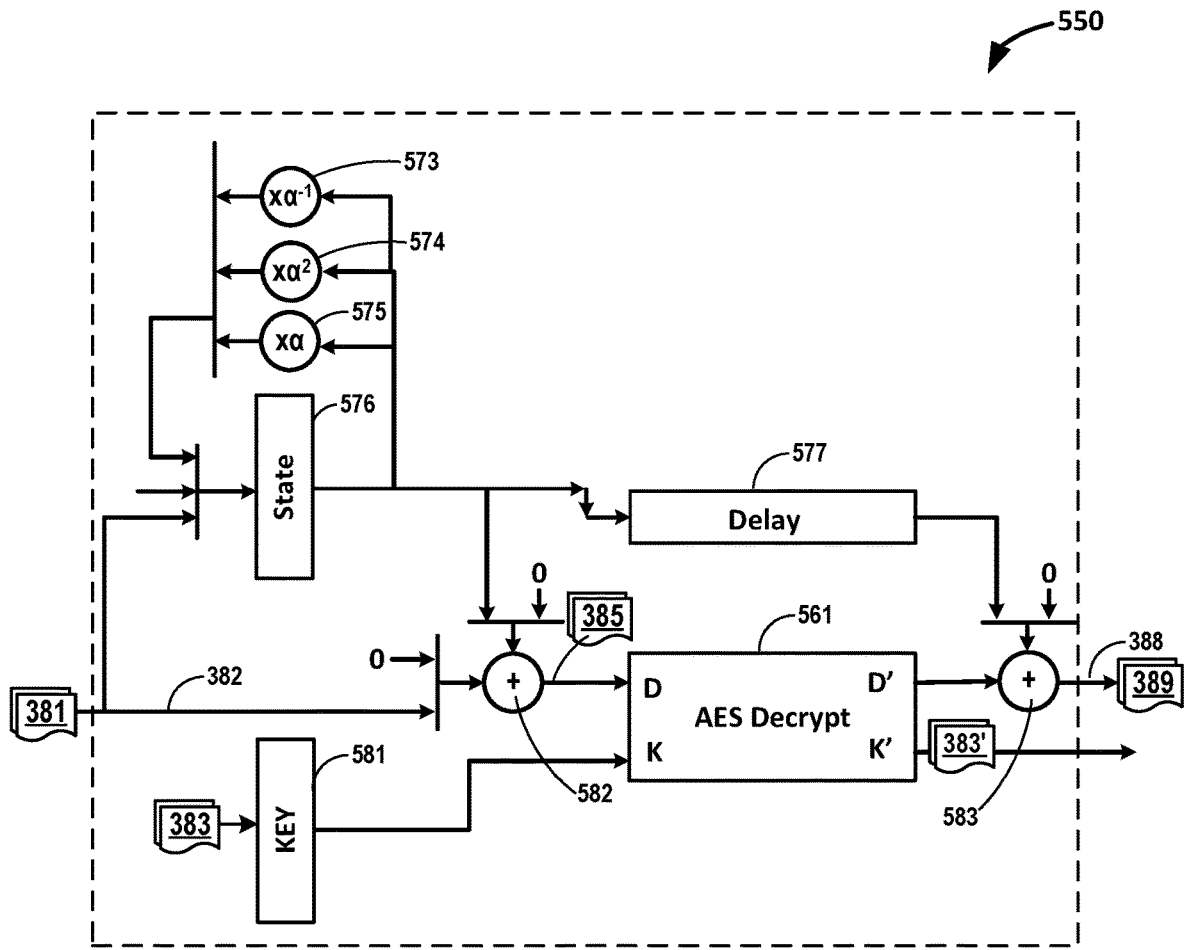
FIG. 8A is a conceptual diagram illustrating an example AES block which may perform multiple modes of AES decryption operations, in accordance with one or more aspects of the present disclosure.
Figure 8B:
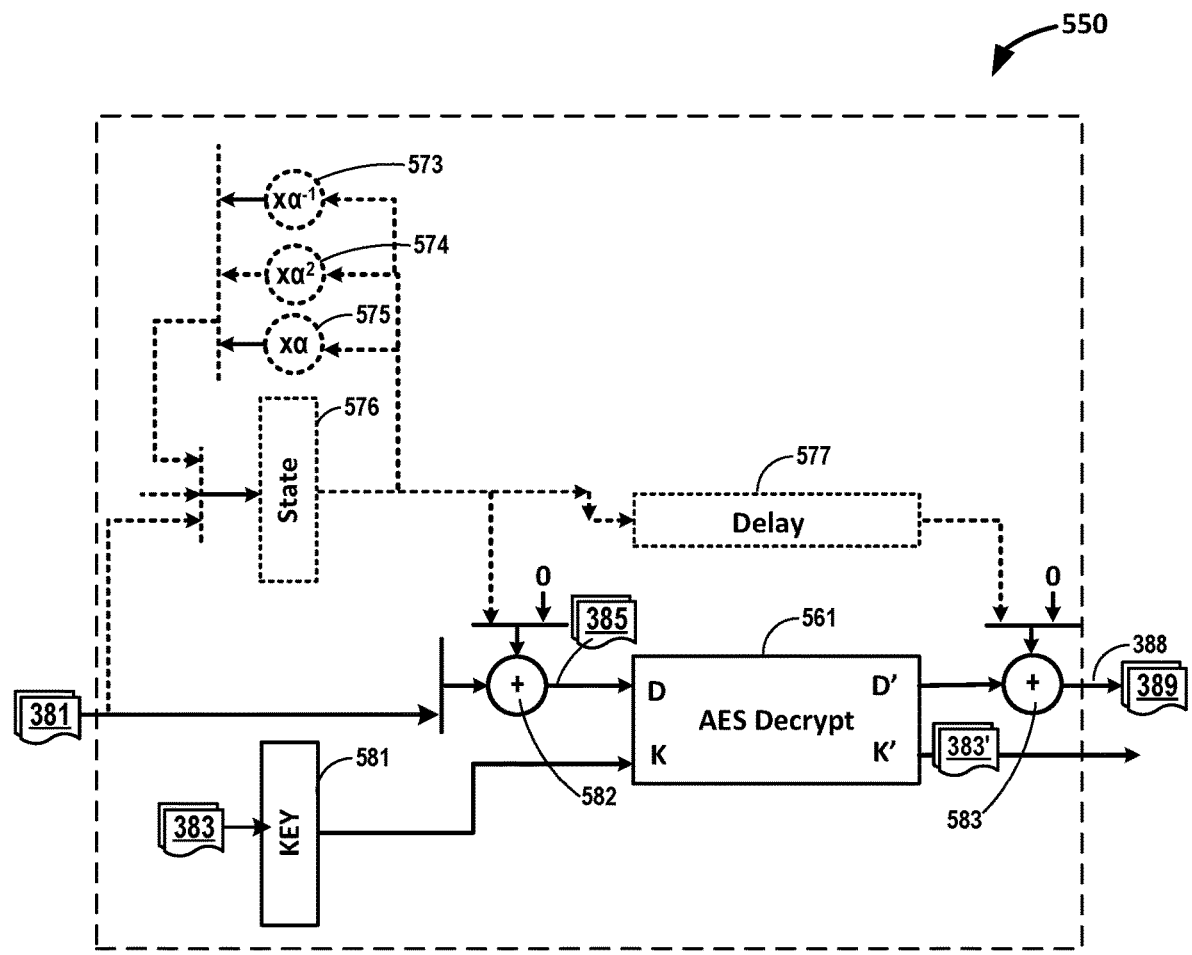
FIG. 8B is a conceptual diagram, derived from FIG. 8A, illustrating AES decryption in AES ECB mode, in accordance with one or more aspects of the present disclosure.
Figure 8C:
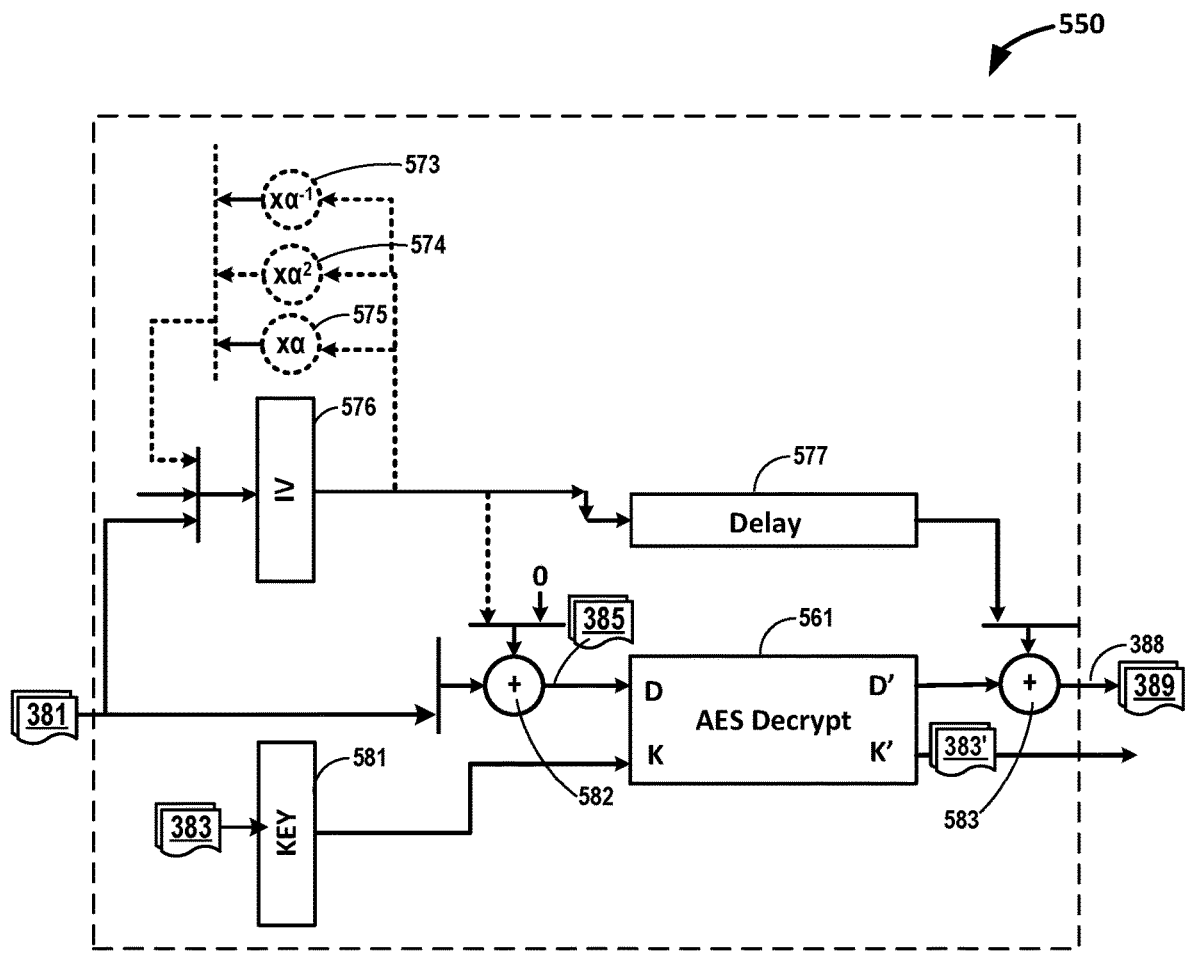
FIG. 8C is a conceptual diagram, derived from FIG. 8A, illustrating AES decryption in AES CBC mode, in accordance with one or more aspects of the present disclosure.
Figure 8D:
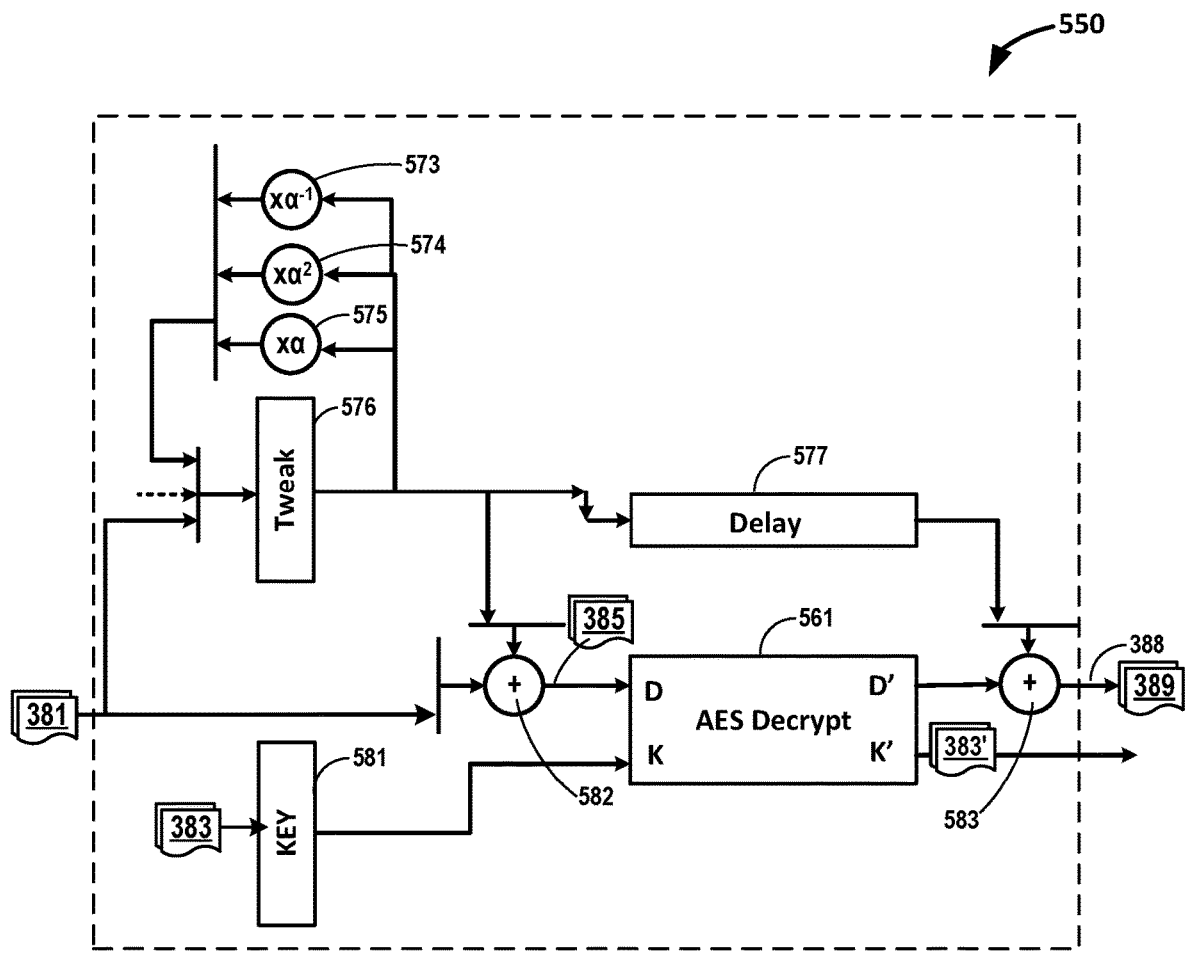
FIG. 8D is a conceptual diagram, derived from FIG. 8A, illustrating AES decryption in AES XTS mode, in accordance with one or more aspects of the present disclosure.

FIG. 8A is a conceptual diagram illustrating an example AES block which may perform multiple modes of AES decryption operations, in accordance with one or more aspects of the present disclosure. FIG. 8A illustrates AES block 550, which represents a unified, multi-threaded, high-throughput decryption system for performing any of multiple modes of AES decryption. AES block 550 of FIG. 8A may be an example implementation of AES block 350 of FIG. 6A, FIG. 6B, and FIG. 6C. Each of FIG. 8B through FIG. 8D illustrate how AES block 550 of FIG. 8A may be reconfigured to perform a specific AES decryption mode. As described in connection with FIG. 7A, some or all of the components within control logic 370 of FIG. 8A may be capable of being selectively disabled by configuration logic (e.g., other logic within AES control logic 370). Accordingly, in some examples, AES control logic 370 causes the appropriate functional components included within control logic 370 to be disabled or enabled, based on the appropriate configuration for a given AES decryption mode.

In FIG. 8A, AES block 550 accepts encrypted input data 381 over connection 382 and generates unencrypted mode output data 389 using key 383. AES block 550 outputs mode output data 389 over connection 388 to other components within an AES processor, such as AES processor 300 of FIG. 6A, FIG. 6B, and FIG. 6C. AES block 550 of FIG. 8A is very similar to AES block 550 of FIG. 7A, and includes many of the components of FIG. 7A, but AES encryption pipeline 560 has been replaced with AES decryption pipeline 561 for decryption operations. AES block 550 of FIG. 8A also includes multiplication block 573 and multiplication block 574, which may be used in XTS mode, as described in connection with FIG. 9A and FIG. 9B. AES decryption pipeline 561 is generally the reverse of AES encryption pipeline 560 and may require the input key to be the final round key instead of the initial round key. AES encryption pipeline 560 may be used to transform the initial round key into the final round key, as illustrated in FIG. 7B.

FIG. 8B is a conceptual diagram, derived from FIG. 8A, illustrating AES decryption in AES ECB mode, in accordance with one or more aspects of the present disclosure. In FIG. 8B, none of multiplication block 573, multiplication block 574, multiplication block 575, state register 576, and delay pipeline 577 are used, and are therefore shown grayed-out.

In the example of FIG. 8B, AES block 550 may decrypt input data 381 to generate unencrypted mode output data 389. For instance, with reference to FIG. 8B, each block of encrypted input data 381 to be decrypted is processed by XOR block 582 with 0, so that it is unchanged. XOR block 582 feeds the result into AES decryption pipeline 561 with key 383 from key register 581. AES decryption pipeline 561 generates, after some number cycles (e.g., fourteen cycles), unencrypted data. AES decryption pipeline 561 feeds the unencrypted data into XOR block 583, where it is processes with 0, so that it is unchanged. XOR block 583 outputs the resulting data as mode output data 389.

FIG. 8C is a conceptual diagram, derived from FIG. 8A, illustrating AES decryption in AES CBC mode, in accordance with one or more aspects of the present disclosure. In FIG. 8C, none of multiplication block 573, multiplication block 574, and multiplication block 575 are used.

In the example of FIG. 8C, AES block 550 may decrypt input data 381 to generate unencrypted mode output data 389. For instance, with reference to FIG. 8C, state register 576 initially holds an initialization vector, but that data is overwritten with subsequent blocks of ciphertext. XOR block 582 performs an XOR operation with 0, and feeds the result (input data 381) into AES decryption pipeline 561 along with key 383. Decrypted data emerges from AES decryption pipeline 561, and XOR block 583 performs an XOR operation on the data with either the initialization vector or delayed ciphertext (from a prior input data 381) that has been delayed by an amount to match the latency of AES decryption pipeline 561. The result of XOR block 583 is unencrypted mode output data 389. In the decrypt CBC operation illustrated in FIG. 8C, unlike the CBC encrypt operation, there is no feedback path. Accordingly, in some examples involving CBC decryption operations, a single thread may be sufficient to ensure AES block 550 is highly utilized.

FIG. 8D is a conceptual diagram, derived from FIG. 8A, illustrating AES decryption in AES XTS mode, in accordance with one or more aspects of the present disclosure. In the example of FIG. 8D, AES block 550 may decrypt input data 381 to generate unencrypted mode output data 389. For instance, with reference to FIG. 8D, state register 576 holds an encrypted tweak value, which was generated by an initial AES encrypt operation (as is the case for the XTS encrypt mode, illustrated in FIG. 7F). For each block, multiplication block 575 multiplies the tweak value by a and feeds the result back to state register 576. XOR block 582 performs an XOR operation on the contents of state register 576 and encrypted input data 381. XOR block 582 outputs the result to AES decryption pipeline 561. Decrypted data emerges from AES decryption pipeline 561. XOR block 583 performs an XOR operation on the decrypted data with the output of delay pipeline 577, which represents a tweak value delayed an amount to match the latency of AES decryption pipeline 561. XOR block 583 outputs decrypted mode output data 389.

In FIG. 8D, the operation performed by multiplication block 575 (multiplication by a) can be accomplished in a single cycle, so blocks from the same stream can be fed in back-to-back cycles. Therefore, a single thread may suffice to keep the engine highly utilized in XTS decrypt mode. However, the ciphertext stealing in the final block does introduce a CBC-style feedback dependency, as described in FIG. 9B.

Figure 9A:
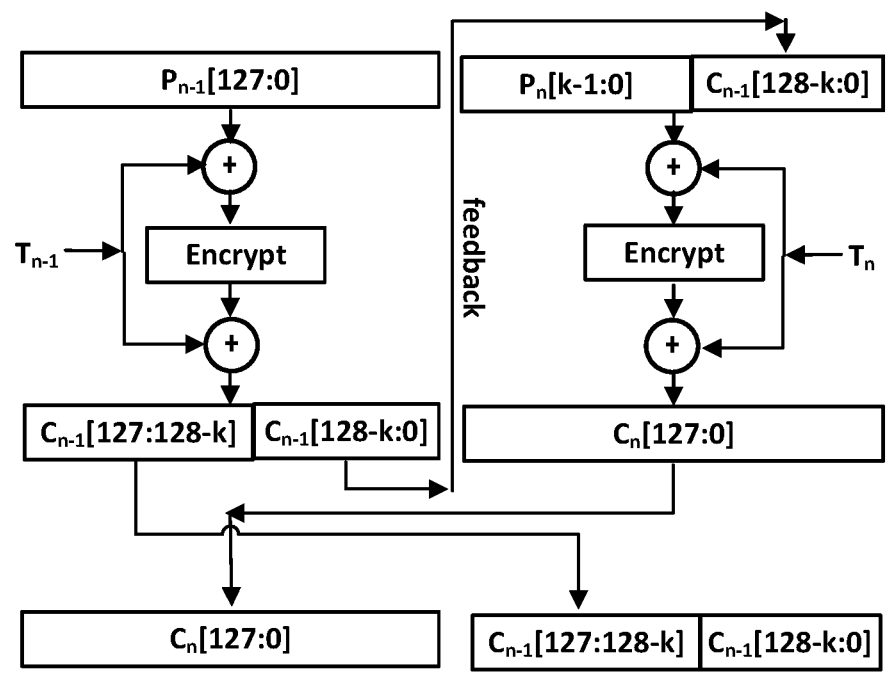
FIG. 9A is a conceptual diagram illustrating a cipher text stealing operation performed pursuant to encryption in AES XTS mode, in accordance with one or more aspects of the present disclosure.

FIG. 9A is a conceptual diagram illustrating a cipher text stealing operation performed pursuant to encryption in AES XTS mode, in accordance with one or more aspects of the present disclosure. As described in connection with FIG. 7F, XTS encryption does not have a long feedback loop, and can consume blocks from the same stream in back-to-back cycles, with the exception of the ultimate block. If the ultimate block is not full, then, as shown in FIG. 9A, it is padded with bits stolen from the ciphertext of the penultimate block, introducing a long feedback dependency between the penultimate and ultimate blocks. The ciphertext that is stolen from the penultimate block is discarded from the output since it is now present in the ultimate block. By convention, the full block of ciphertext derived from the ultimate block of plaintext is output before the truncated block of ciphertext derived from the penultimate block of plaintext, because this is the order in which the blocks are to be processed during decryption. This reordering of the final blocks can be performed by software.

In FIG. 9A, and with reference to FIG. 7F and FIG. 8D, the tweak value ($T_N$) typically is held in state register 576 until the ultimate plaintext block can be formed. The partial ultimate plaintext may enter the front of the pipeline just as the (to be) stolen ciphertext emerges from the back so that additional per-thread state information is not required to bring them together. If this cannot be guaranteed, however, the stolen ciphertext is stored in addition to the final tweak until the partial ultimate plaintext block arrives.

Figure 9B:
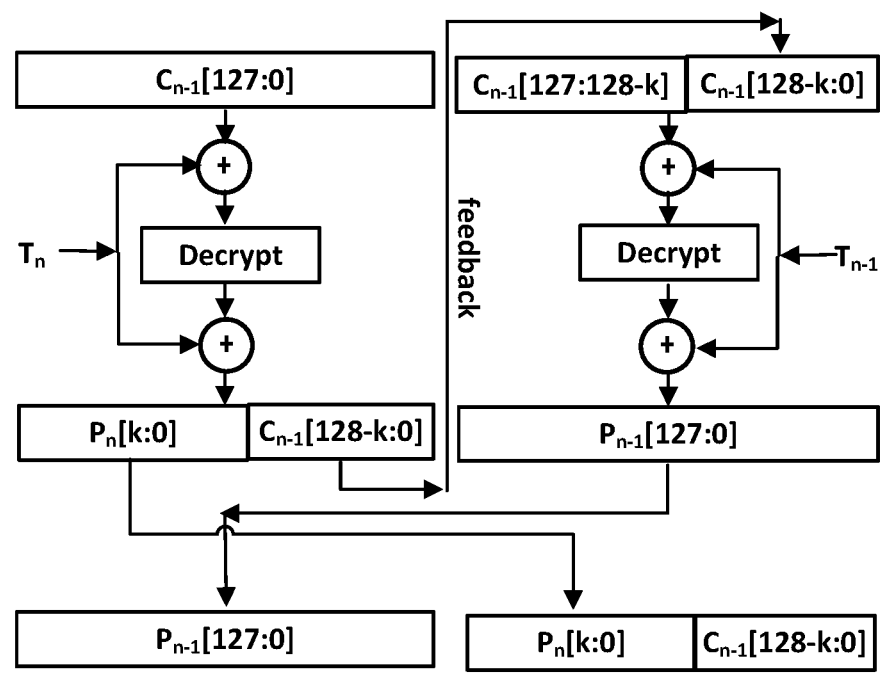
FIG. 9B is a conceptual diagram illustrating a cipher text stealing operation performed pursuant to decryption in AES XTS mode, in accordance with one or more aspects of the present disclosure.

FIG. 9B is a conceptual diagram illustrating a cipher text stealing operation performed pursuant to decryption in AES XTS mode, in accordance with one or more aspects of the present disclosure. As described in connection with FIG. 8D, XTS decryption can also consume blocks in back-to-back cycles, with the exception of the ultimate block of ciphertext, if it is not full. When it is not full, the penultimate block of ciphertext is by AES block 550 decrypted to reveal the partial block of ultimate plaintext, and the stolen partial block of penultimate ciphertext. As illustrated in FIG. 9B, the partial block of ciphertext is reunited with what is now the ultimate block of ciphertext and decrypted to reveal the full block of penultimate plaintext. This procedure may introduce a long feedback dependency, significantly impacting the throughput of AES block 550 in AES XTS mode.

In some examples, the final two tweak values are consumed out of order. To address this, multiplication block 574 may multiply the contents of state register 576 by the square of a (e.g., a left-shift of two bits, with feedback XOR taps determined by the 2 most significant bits) for the penultimate block (which will take $T_{N-2}$ up to $T_N$). Multiplication block 573 then multiplies the value of state register 576 by the inverse of a (e.g., a right shift of 1 bit with feedback XOR taps determined by the least significant bit) for the ultimate block (which will take $T_N$ back down to $T_{N-1}$). In some examples, this procedure may be preferred over providing an additional per-thread register to reorder the tweaks. Consequently, the AES encrypt and decrypt pipelines should provide sufficient threads to cover the latency of the final block of XTS. Note however that a large number of back-to-back blocks can amortize the cost of allowing the pipeline to go unused while waiting for the penultimate block if there are no other threads available.

Figure 10:
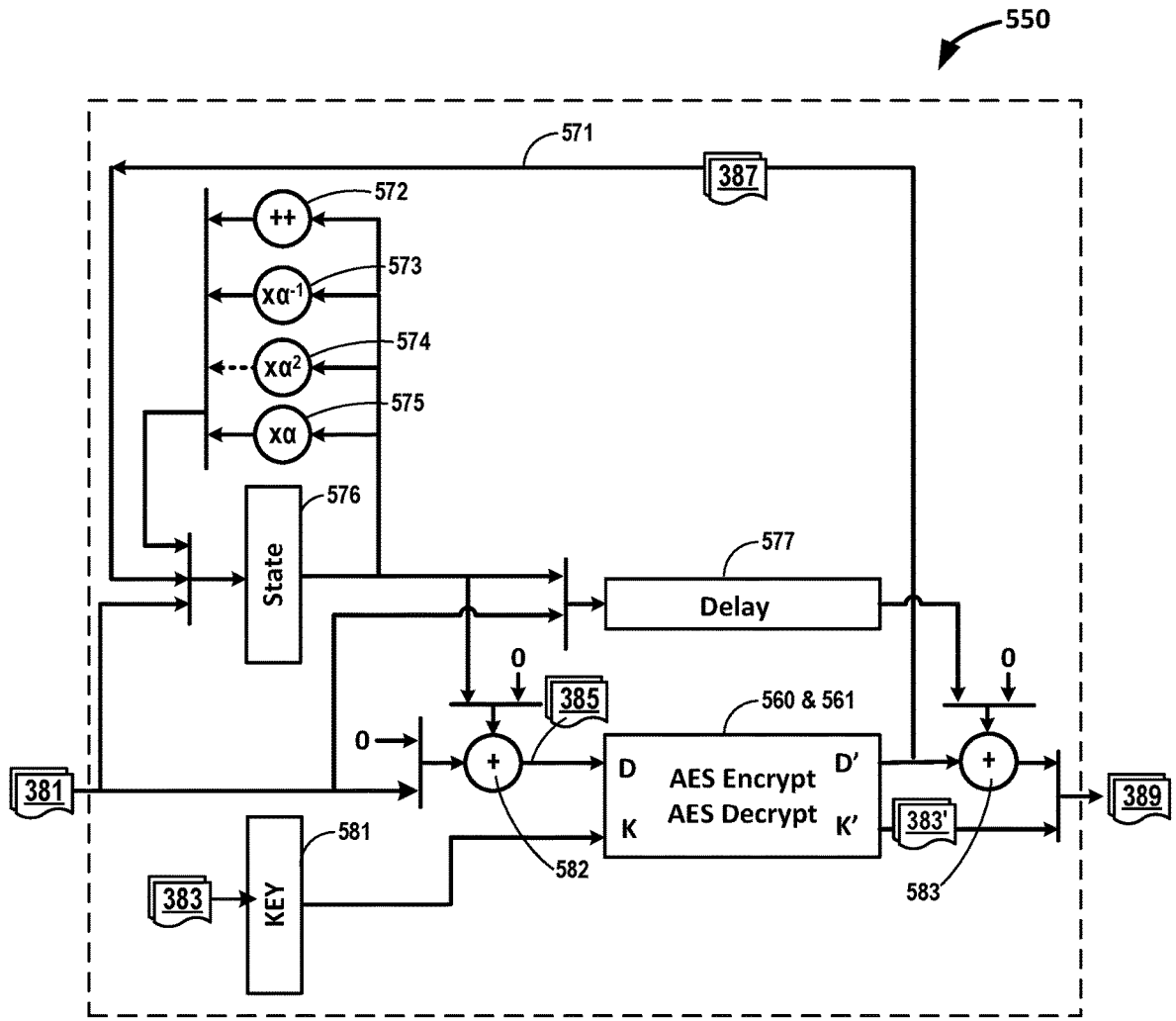
FIG. 10 is a conceptual diagram illustrating an example AES block which may perform multiple modes of both AES encryption and AES decryption operations, in accordance with one or more aspects of the present disclosure.

FIG. 10 is a conceptual diagram illustrating an example AES block which may perform multiple modes of both AES encryption and AES decryption operations, in accordance with one or more aspects of the present disclosure. FIG. 10 illustrates AES block 550, which represents a unified, multi-threaded, high-throughput encryption and decryption system for performing any of multiple modes of AES cryptographic operations. AES block 550 of FIG. 10 may be an example implementation of AES block 350 of FIG. 6A, FIG. 6B, and FIG. 6C, and may correspond to AES block 550 of FIG. 7A through FIG. 7F and FIG. 8A through FIG. 8D.

In FIG. 10, AES block 550 accepts encrypted input data 381 or decrypted input data 381 over connection 382 and generates, using key 383, unencrypted mode output data 389 or encrypted mode output data 389, respectively. AES block 550 of FIG. 10 may be thought of as a merger of AES block 550 of FIG. 7A and AES block 550 of FIG. 8A, providing a uniform system AES block 550 for both AES encryption and decryption operations. Accordingly, in FIG. 10, AES block 550 includes both AES encryption pipeline 560 and AES decryption pipeline 561, for performing multistage AES encryption and decryption operations, respectively.

Figure 11:
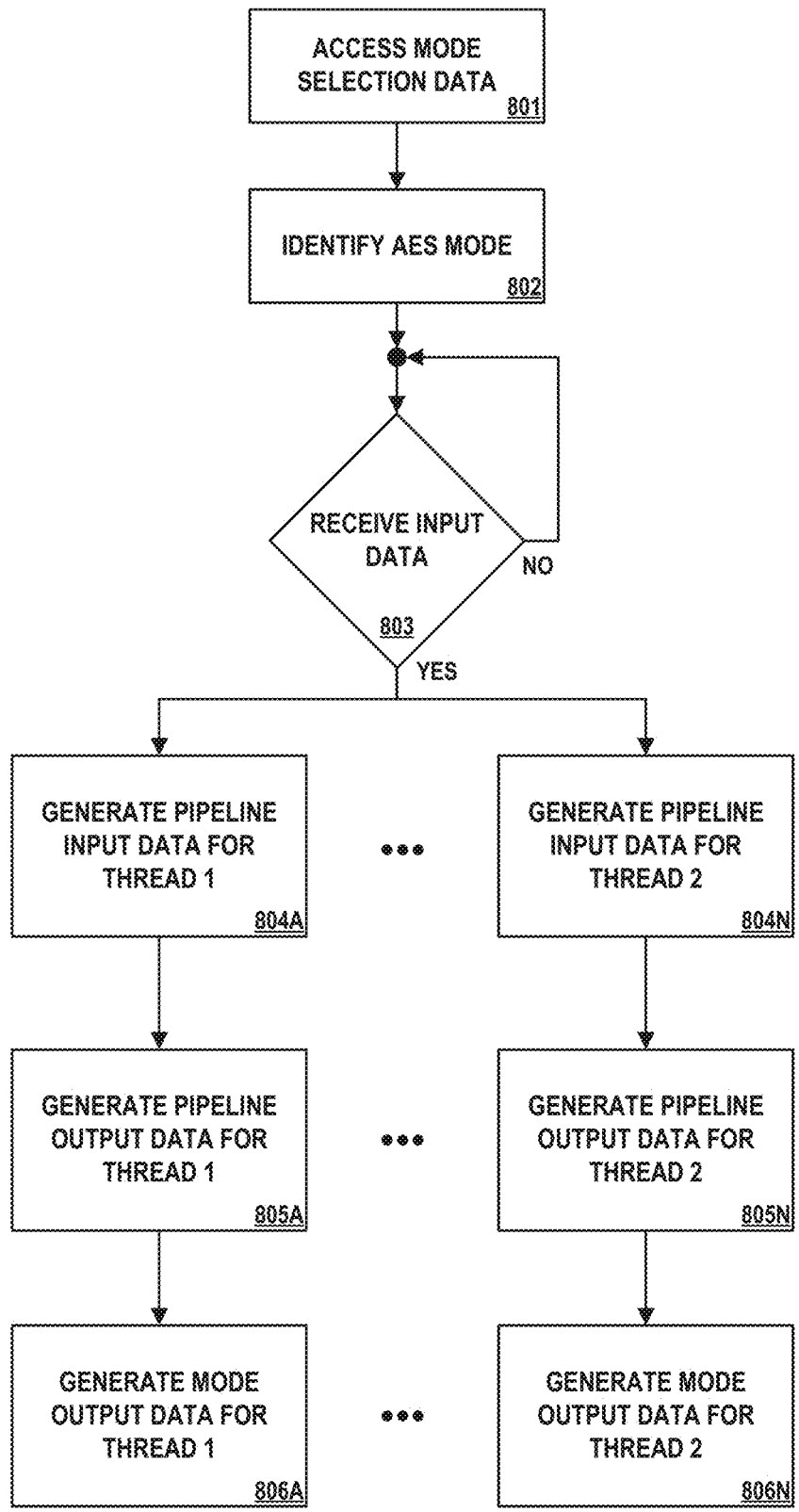
FIG. 11 is a flow diagram illustrating operations performed by an example AES block in accordance with one or more aspects of the present disclosure.

FIG. 11 is a flow diagram illustrating operations performed by an example AES block in accordance with one or more aspects of the present disclosure. FIG. 11 is described below within the context of AES block 350 of FIG. 6C. In other examples, operations described in FIG. 11 may be performed by one or more other components, modules, systems, or devices. Further, in other examples, operations described in connection with FIG. 11 may be merged, performed in a difference sequence, omitted, or may encompass additional operations not specifically illustrated or described.

In the example of FIG. 11, and in accordance with one or more aspects of the present disclosure, AES block 350 may access mode selection data (801). For instance, in some examples, and with reference to FIG. 6C, AES control logic 370 of AES block 350 may access data included within one or more work unit queues 221 (included within DMA block 220). In such an example, the accessed data may be data that corresponds to or is derived from a work unit data structure that includes an opcode identifying an AES mode. In some examples, AES control logic 370 may access the opcode within data stored within packet memory 316, and AES control logic 370 may access the data stored within packet memory 316 over connection 382. AES control logic 370 may store mode selection data (e.g., data corresponding to or derived from an opcode) in one or more registers included within AES control logic 370.

AES block 350 may identify a selected AES mode (802). For instance, in some examples, AES control logic 370 evaluates the stored mode selection data and identifies one of a number AES modes capable of being performed by AES block 350. In some examples, such modes may include a key expansion mode, an AES-ECB mode, an AES-CBC mode, an AES-XCBC mode, an AES-CTR mode, an AES-GCM mode, and AES-XTS mode, or another mode. In other examples, the stored mode selection data may indicate that AES block 350 is to operate as a pass-through block, which may result in some or all of input data 381 received over connection 382 being output over connection 388 without modification.

AES block 350 may receive input data (803). For instance, in some examples, AES block 350 may monitor connection 382 for data. AES block 350 may receive a plurality of sets of input data 381 over connection 382 (YES path from 803). Input data 381 may be plaintext data to be transformed into encrypted data, or input data 381 may be encrypted data to be decrypted or transformed into plaintext data. Accordingly, input data 381 may be encrypted or unencrypted data, and correspondingly, mode output data 389 may be encrypted or unencrypted data. In some examples, input data 381 may be data from which a digest or a hash value is to be generated. In such an example, mode output data 389 may be a hash value resulting from such a process. AES control logic 370 may wait until data is received before performing cryptographic operations (NO path from 803).

AES block 350 may generate multiple sets of pipeline input data (804A to 804N). For instance, in some examples, AES block 350 receives, for processing, multiple sets of input data 381 over connection 382. AES control logic 370 of AES block 350 processes each set of the input data 381 simultaneously and/or concurrently to generate multiple sets of pipeline input data 385. To generate each of the sets of pipeline input data 385, AES control logic 370 performs, using separate threads of execution and prior to feeding the data into AES pipeline 360, operations relating to the requirements of the selected AES mode. For instance, in some modes, input data 381 may be processed by XOR operations involving state variables or initialization vectors, or in other examples, processing of other data (e.g., counters) may be performed. AES control logic 370 outputs each of the sets of pipeline input data 385 to AES pipeline 360, and for each set of pipeline input data 385, outputs to AES pipeline 360 one of a set of cryptographic keys 383. Any number of threads may be used in the example of FIG. 11 (threads represented by 804A through 804N, where "N" is any number). However, a typical multistage AES pipeline 360 is generally no more than 14 stages in length, if fully rolled-out. In some examples, a practical limit on the number of threads that may be implemented by a system such as that illustrated in FIG. 6C or used when performing the process such as that illustrated in FIG. 11 may be fourteen. Some implementations of the system illustrated in FIG. 6C may use four threads.

AES block 350 may generate multiple sets of pipeline output data (805A to 805N). For instance, in some examples, AES pipeline 360 of AES block 350 performs multistage AES cryptographic operations on each of the sets of pipeline input data 385. AES pipeline 360 performs the cryptographic operations for each set of pipeline input data 385 on a different thread, using a different one of keys 383. AES pipeline 360 generates, for each set of pipeline input data 385, a corresponding set of pipeline output data 387. AES pipeline 360 outputs each set of pipeline output data 387 back to AES control logic 370.

AES block 350 may generate multiple sets of mode output data (806A to 806N). For instance, in some examples, AES control logic 370 outputs to output memory 318, for each set of pipeline output data 387 received from AES pipeline 360, a set of mode output data 389. In some examples, depending on the selected AES mode, AES control logic 370 outputs each set of mode output data 389 based on each corresponding set of pipeline output data 387 with little or no further processing. In other examples, again depending on the selected AES mode, AES control logic 370 processes each set of pipeline output data 387 in a separate thread and feeds the resulting data (as new sets of pipeline input data 385) back to AES pipeline 360 for additional processing by AES pipeline 360 (i.e., in a feedback loop). AES pipeline 360 processes each of the new sets of pipeline input data 385 and outputs new sets of pipeline output data 387. AES control logic 370 may perform additional feedback loops by further processing the new sets of pipeline output data 387 and feeding the resulting data back to AES pipeline 360 (as additional new sets of pipeline input data 385). Eventually, AES control logic 370 receives final sets of pipeline output data 387 from AES pipeline 360, processes each set of pipeline output data 387, and outputs the resulting data as sets of mode output data 389.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., servers 12, access nodes 17, storage devices 62, security blocks 208, AES processors 300, SHA processors 400, AES blocks 350, AES pipelines 360, sets of AES control logic 370, as well as others) are shown within the Figures and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 6A, FIG. 6B, FIG. 6C, FIG. 6D, FIG. 10) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A device comprising:
   a plurality of key registers configured to receive a plurality of cryptographic keys;
   a multistage Advanced Encryption Standard (AES) pipeline configured to receive each of the plurality of cryptographic keys from the plurality of key registers;
   a plurality of data paths;

a bit-shifting module;
a delay buffer; and
control logic for performing cryptographic operations pursuant to each of a plurality of AES modes, wherein the plurality of AES modes include at least one mode in which feedback is employed by the multistage AES pipeline and at least one mode in which feedback is not employed by the multistage AES pipeline, and wherein the control logic is configured to concurrently perform each of the plurality of AES modes by using, for each of the AES modes, the Advanced Encryption Standard (AES) pipeline and by sharing the bit-shifting module and at least some of the plurality of data paths within the device.

2. The device of claim 1, wherein the control logic is further configured to:
perform each of the plurality of AES modes by sharing the delay buffer among the plurality of AES modes.

3. The device of claim 1, wherein the plurality of AES modes includes an XTS mode, and wherein the control logic is further configured to:
perform the XTS mode using the bit-shifting module on a tweak value.

4. A system comprising:
a multistage Advanced Encryption Standard (AES) pipeline configured to receive each of a plurality of cryptographic keys from a plurality of key registers;
control logic including a plurality of data paths, a bit-shifting module, and a delay buffer, wherein the control logic is configured to concurrently perform cryptographic operations pursuant to each of a plurality of AES modes by sharing the bit-shifting module and at least some of the plurality of data paths, wherein the plurality of AES modes include at least one mode in which feedback is employed by the multistage AES pipeline and at least one mode in which feedback is not employed by the multistage AES pipeline, and wherein the control logic is further configured to:
identify a selected AES mode from among the plurality of AES,
receive a plurality of sets of input data to be processed by a cryptographic operation associated with the selected AES mode,
generate, from the plurality of sets of input data based on the selected AES mode, a plurality of sets of pipeline input data,
enable the multistage AES pipeline to process, using one or more cryptographic keys, each of the plurality of sets of pipeline input data concurrently using a plurality of threads to generate a plurality of sets of pipeline output data, wherein each of the plurality of sets of pipeline output data is generated by the multistage AES pipeline based on a respective one of the plurality of sets of pipeline input data, and
generate, based on each of the plurality of sets of pipeline output data and the selected AES mode, a plurality of sets of mode output data, wherein each of the plurality of sets of mode output data corresponds to a respective one of the plurality of sets of input data after performing the cryptographic operation associated with the selected AES mode.

5. The system of claim 4, wherein the control logic is further configured to:
perform each of the plurality of AES operation modes by sharing the delay buffer among the plurality of AES operation modes.

6. The system of claim 4, wherein the control logic is configured to perform any of the plurality of AES operation modes, and wherein the control logic is further configured to:
perform an XTS mode using the bit-shifting module on a tweak value.

7. The system of claim 4, wherein to generate the plurality of sets of pipeline input data, the control logic is further configured to:
disable a first subset of the control logic for processing the plurality of sets of input data; and
enable a second subset of the control logic for processing the plurality of sets of input data.

8. The system of claim 4, wherein to generate the plurality of sets of mode output data, the control logic is further configured to:
disable a first subset of the control logic for processing the plurality of sets of pipeline output data; and
enable a second subset of the control logic for processing the plurality of sets of pipeline output data.

9. The system of claim 4, wherein the plurality of sets of pipeline input data are a first plurality of sets of pipeline input data, wherein the plurality of sets of pipeline output data are a first plurality of sets of pipeline output data, and wherein to generate the plurality of sets of mode output data, the control logic is further configured to:
generate, from the first plurality of sets of pipeline output data, a second plurality of sets of pipeline input data;
enable the multistage AES pipeline to process the second plurality of sets of pipeline input data to generate a second plurality of sets of pipeline output data,
wherein each of the second plurality of sets of pipeline output data is based on a respective one of the second plurality of sets of pipeline input data after processing by the multistage AES pipeline; and
generate, based on each of the second plurality of sets of pipeline output data, the plurality of sets of mode output data.

10. The system of claim 4, wherein the selected AES mode is a first selected AES mode, wherein the plurality of sets of input data is a first plurality of sets of input data, wherein the plurality of sets of mode output data is a plurality of sets of first mode output data, and the control logic is further configured to:
identify a second selected AES mode from among the plurality of AES operation modes capable of being performed by the system;
receive a second plurality of sets of input data to be processed by a cryptographic operation associated with the second selected AES mode; and
generate, based on the second plurality of sets of input data and the second selected AES mode, a plurality of sets of second mode output data, wherein each of the plurality of sets of second mode output data is one of the second plurality of sets of input data after performing the cryptographic operation associated with the second selected AES mode.

11. The system of claim 10, wherein to generate the plurality of sets of second mode output data, the control logic is further configured to:
generate the plurality of sets of second mode output data using only a single thread of execution.

12. The system of claim 4, wherein the AES pipeline is a fourteen-stage AES pipeline, and wherein the control logic is further configured to:
identify a length of the one or more cryptographic keys; and configure, based on the length of the one or more cryptographic keys, a plurality of the stages of the fourteen-stage AES pipeline as passthrough stages.

13. The system of claim 4, wherein the one or more cryptographic keys is a plurality of cryptographic keys, and wherein to process each of the plurality of sets of pipeline input data, the control logic is further configured to:

process each of the plurality of sets of pipeline input data with a different one of the plurality of cryptographic keys.

14. A system comprising logic and processing circuitry, wherein the logic includes a plurality of data paths, a bit-shifting module, and a delay buffer, and wherein the processing circuitry is configured to concurrently perform cryptographic operations pursuant to each of a plurality of AES modes by sharing the delay buffer and at least some of the plurality of data paths, wherein the plurality of AES modes include at least one mode in which feedback is employed by a multistage AES pipeline and at least one mode in which feedback is not employed by the multistage AES pipeline, and wherein the processing circuitry is further configured to use the logic to:

identify a selected AES mode from among the plurality of AES modes;

receive a plurality of sets of input data to be processed by a cryptographic operation associated with the selected AES mode;

generate, from the plurality of sets of input data based on the selected AES mode, a plurality of sets of pipeline input data;

enable the multistage AES pipeline to process, using one or more cryptographic keys, each of the plurality of sets of pipeline input data concurrently using a plurality of threads to generate a plurality of sets of pipeline output data, wherein each of the plurality of sets of pipeline output data is generated by the multistage AES pipeline based on a respective one of the plurality of sets of pipeline input data; and generate, based on each of the plurality of sets of pipeline output data and the selected AES mode, a plurality of sets of mode output data, wherein each of the plurality of sets of mode output data corresponds to a respective one of the plurality of sets of input data after performing the cryptographic operation associated with the selected AES mode.

15. The system of claim 14, wherein to generate the plurality of sets of pipeline input data, the processing circuitry is further configured to:

disable a first set of control logic for processing the plurality of sets of input data; and enable a second set of control logic for processing the plurality of sets of input data.

16. The system of claim 14, wherein to generate the plurality of sets of mode output data, the processing circuitry is further configured to:

disable a first set of control logic for processing the plurality of sets of pipeline output data; and enable a second set of control logic for processing the plurality of sets of pipeline output data.

17. The system of claim 14, wherein the plurality of sets of pipeline input data are a first plurality of sets of pipeline input data, wherein the plurality of sets of pipeline output data are a first plurality of sets of pipeline output data, and wherein to generate the plurality of sets of mode output data, the processing circuitry is further configured to:

generate, from the first plurality of sets of pipeline output data, a second plurality of sets of pipeline input data;

enable the multistage AES pipeline to process the second plurality of sets of pipeline input data to generate a second plurality of sets of pipeline output data, wherein each of the second plurality of sets of pipeline output data is based on a respective one of the second plurality of sets of pipeline input data after processing by the multistage AES pipeline;

generate, based on each of the second plurality of sets of pipeline output data, the plurality of sets of mode output data.

18. The system of claim 14, wherein the selected AES mode is a first selected AES mode, wherein the plurality of sets of input data is a first plurality of sets of input data, wherein the plurality of sets of mode output data is a plurality of sets of first mode output data, and the processing circuitry is further configured to:

identify a second selected AES mode from among the plurality of AES operation modes capable of being performed by the system;

receive a second plurality of sets of input data to be processed by a cryptographic operation associated with the second selected AES mode; and generate, based on the second plurality of sets of input data and the second selected AES mode, a plurality of sets of second mode output data, wherein each of the plurality of sets of second mode output data is one of the second plurality of sets of input data after performing the cryptographic operation associated with the second selected AES mode.

* * * * *